US008231452B2

(12) United States Patent
Suda et al.

(10) Patent No.: US 8,231,452 B2
(45) Date of Patent: Jul. 31, 2012

(54) GAMING MACHINE

(75) Inventors: Satoshi Suda, Henderson, NV (US); Daisuke Nakamura, Yamato (JP)

(73) Assignee: Konami Gaming, Inc., Las Vegas, NV (US)

( * ) Notice: Subject to any disclaimer, the term of this patent is extended or adjusted under 35 U.S.C. 154(b) by 310 days.

(21) Appl. No.: 12/454,960

(22) Filed: May 27, 2009

(65) Prior Publication Data

US 2010/0304831 A1 Dec. 2, 2010

(51) Int. Cl.
*A63F 13/00* (2006.01)

(52) U.S. Cl. ............................... 463/20; 463/17; 463/30

(58) Field of Classification Search .................... 463/20, 463/42, 26, 17, 30

See application file for complete search history.

(56) References Cited

U.S. PATENT DOCUMENTS 6,641,477 B1 11/2003 Dietz, II
6,805,632 B2 10/2004 Suda
6,939,228 B2 * 9/2005 Shimizu .......................... 463/20
2004/0127282 A1 * 7/2004 Naobayashi .................... 463/20
2007/0155474 A1 7/2007 Gauselmann
2009/0124391 A1 * 5/2009 Nelson et al. .................. 463/42
2010/0137061 A1 * 6/2010 Ellis ................................ 463/26

FOREIGN PATENT DOCUMENTS

AU 2009200728 A1 9/2009
AU 2009212873 A1 4/2010

OTHER PUBLICATIONS

Examiner's first report on Australian Patent Application No. 2010200847, dispatched date Nov. 18, 2010, IP Australia.

* cited by examiner

*Primary Examiner* — Ronald Laneau
*Assistant Examiner* — Wilner Jean Baptiste
(74) *Attorney, Agent, or Firm* — Masuvalley & Partners

(57) ABSTRACT

The present invention is a gaming machine including a display, which shows a plurality of cells indicating a plurality of symbols, and a controller, which selects a cell in a cell-selecting stage provided between a primary game and a secondary game on the display, controls the plurality of symbols in the secondary game and gives a predetermined function to the selected cell in the secondary game.

19 Claims, 22 Drawing Sheets

GAMING MACHINE

TECHNICAL FIELD

The present invention relates to gaming machines having a primary game and a secondary game for use in casinos, pachisuro slot machine parlors, etc.

BACKGROUND OF THE INVENTION

Slot machines are popular gaming machines in casinos. There are many types of slot machines and some of the slot machines have a display for displaying a plurality of cells or columns in which symbols (or indicia) are shown randomly in each game. When the symbols shown in the cells or columns form one or more winning combinations, a corresponding prize is paid to the player. Also, recent slot machines typically have a primary game and a secondary game. The secondary game may comprise any type of game, either similar to or completely different from the primary game. The secondary game is initiated upon the occurrence of a selected event or outcome of the primary game. For example, the secondary game may be embodied as a free spin game, which comprises one or a series of slot games conducted "for free", i.e., without requiring wager or credit paid by the player. Each slot game, which contains start and stop of rotation of the reels along which symbols are arranged, may be called a reel spin. Often times, the secondary game is carried out as a bonus game of the primary game, and therefore designed so that higher prizes may be paid to the player to whereby enhance the excitement of the player.

One example of the above gaming machine is disclosed in U.S. Pat. No. 6,805,632. This patent is related to a video slot machine. The video slot machine includes a display device for displaying a plurality of symbols in a grid having a plurality of cells defined by rows and columns, a memory device for storing a pay-table, and a game controller coupled to the display device and the memory device. The game controller is adapted to randomly select the symbols to be displayed in the display device and to determine an outcome based on the displayed symbols, pay-table, and predetermined pay lines in the primary game and the secondary game. The selected symbols occasionally include a bonus symbol. The game controller is adapted to identify the presence of the bonus symbol in one of the cells of a column and to modify all of the symbols within the column to wild.

However, as the players get used to the gaming machines having primary and secondary games, the excitement provided by the gaming machines tends to be insufficient to fully satisfy the players. Thus, new features are necessary to satisfy demands of the players for greater excitement and thereby entice a longer play period. Particularly, when the secondary game is of the same type of game as the primary game (for example, when the primary game is a slot game and the secondary game consists of a free spin game), the secondary game can be less entertaining to the players. Thus, a secondary game having novel features is demanded in order to provide a higher excitement to the players. However, designing a totally new game for the secondary game would require a considerable time and cost. Under such circumstances, there is a need for a novel gaming machine having a primary game and a secondary game that can provide a higher level of excitement to the player with minimum modifications to the existing gaming machines. The gaming machine of the present invention is directed to satisfying these needs.

SUMMARY OF THE INVENTION

One aspect of the present invention may be a gaming machine including a display, which shows a plurality of cells indicating a plurality of symbols, and a controller, which selects a cell in a cell-selecting stage provided between a primary game and a secondary game on the display, controls the plurality of symbols in the secondary game and gives a predetermined function to the selected cell in the secondary game.

By providing a game stage having a new concept of cell-selection between the primary game and the secondary game, it is possible to attract the player's attention to the selected cell and the player may consider that an excellent award related to the selected cell may happen. Accordingly, good feeling and new experience can be given to the player.

Also, the cell-selection between the primary game and the secondary game can provide the player with new expectation on the game results, which did not exist in the conventional gaming machines. Thus the gaming machine having the cell-selection stage between the primary game and the secondary game can provide higher excitement to the player. Further, since the selected cell is used to perform a given predetermined function in the secondary game, the player can have new feeling from the secondary game even if the basic configuration of the secondary game may be the same as the conventional one. The characteristics of the secondary game can be changed significantly depending on which cell has been selected and/or what function has been given to the selected cell, and thus the player can play the game for an extended period of time without becoming bored. Further, the game designer can easily adjust the characteristics of the game by changing the parameters related to the cell-selection, such as a frequency of occurrence of cell selection, number of cells selected, and/or function provided to the selected cell, for example, without modifying the basic configuration of the secondary game.

The controller may decide whether the controller selects zero or more cells in the cell-selecting stage. In other words, it is possible to design the cell-selecting stage such that no cell may be selected by the controller in the cell-selecting stage.

With this arrangement, there is a possibility that no cell is selected in the cell-selecting stage. This can increase the excitement of the player when one or more cells are selected.

The controller may select more than one of the plurality of cells in the cell-selecting stage. In such a case, the controller may show the same symbols on the selected cells in the secondary game. Alternatively, the controller may show a plurality of symbols related with each other on the selected cells in the secondary game. Further, the controller may show a plurality of wild symbols in the selected cells. With these arrangements, the player can have more expectation of a large award in the secondary game because the probability of winning increases.

In one preferred embodiment, the primary game and the secondary game may be designed to perform a slot game using reel strips provided in the gaming machine. The symbols are arranged along the reel strips so that when the reels formed by the reel strips stop rotating, certain symbols are shown in the cells. It should be noted here that the reel strips and the reels may be mechanical ones that are used in mechanical slot machines or virtual (or simulated) ones that are used in video slot machines. The reel strips may be used not only in the primary and secondary games but also in the cell-selecting stage to select a cell or indicate a selected cell. This can be done, for example, by rotating the reels for a while and showing a predetermined symbol in the selected cell when the rotation of the reels is stopped in the cell-selecting stage. In this way, the present invention can be favorably applied to the conventional slot machines having primary and secondary games, to whereby provide the players with higher excitement owing to the cell-selecting stage. Also, the reel strips used in the cell-selecting stage can be different from those used in the primary and secondary games. This can be achieved in video slot machines by using different virtual reel strips (i.e., having different symbol arrangements) for the cell-selecting stage and for the primary and secondary games. Of course, different reel strips may be used for the primary game and for the secondary game in video slot machines. In mechanical slot machines, a structure having outer and inner reels may be used for such purpose, where the outer and inner reels may be concentric or non-concentric. Specifically, each outer reel may be given a different symbol arrangement from that of the associated inner reel and the outer reels may be used in the cell-selecting stage while inner reels may be used in the primary and secondary games, for instance.

The secondary game is typically configured as a free game, i.e., conducted without requiring a wager placed by the player. This is because the secondary game is usually provided as a bonus game for entertaining the player and requiring a wager would decrease the player's pleasure provided by the secondary game.

The controller may select more than one of the plurality of cells in the cell-selecting stage and show a plurality of symbols related with each other under a substantially static state on the selected cells on the display while moving the symbols in non-selected cells in the secondary game. For example, the movement of the symbols in the non-selected cells may be caused by rotating mechanical or video reels on which the symbols are arranged. In mechanical slot machines, the substantially static display of the mutually-related symbols in the selected cells can be achieved by using a transparent display such as a transparent LCD (liquid crystal display) overlying the mechanical reels, for example. In this arrangement, the player can easily recognize the related symbols shown on the selected cells. Because the related symbols frequently lead to a large award, the player can have a high expectation on the large award.

Another aspect of the present invention may be a gaming machine including a display, which displays a plurality of reels presenting a plurality of indicia controlled along the reels so as to be indicated in a plurality of cells defined on the display, and a controller, which executes a free spin game, in which a plurality of reel spins are conducted during a term from an initiation to a termination of the free spin game and a game result is evaluated for each reel spin based on the indicia indicated in the cells, selects a cell before an execution of the free spin game, and gives a predetermined function to the selected cell in the free spin game.

By providing the cell-selection before the execution of the free spin game and providing a predetermined function to the selected cell in the free spin game, a greater excitement can be provided to the player though the basic configuration of the free spin game may remain the same as the conventional one. Also, the characteristics of the free spin game can change significantly depending on which cell has been selected and/or what function has been given to the selected cell, and thus the player can play the game for an extended period of time without becoming bored. Further, the game designer can easily adjust the characteristics of the game by changing the parameters related to the cell-selection In the cell-selection, it is possible that the controller may select no cell. The possibility that no cell may be selected in the selection can increase the excitement of the player when one or more cells are selected in the selection.

The controller may show a same indicium on the selected cell for more than one reel spin in the free game. Also, when a plurality of cells are selected in the selection, it is possible to show a same indicium on the selected cells. With these arrangements, the apparent likelihood of winning increases and the player's expectation to a large award is enhanced.

The controller may select at least one cell as a first group and select at least one cell as a second group in the selection. The controller may show an indicium on the cell(s) selected as the first group and show an indicium, which is independent of the indicium shown on the cell(s) selected as the first group, on the cell(s) selected as the second group. Thus, by dividing the selected cells into two groups and assigning the indicia to the two groups independently, it is possible to achieve wider variety of characteristics to the free spin game, and thus prevent the players to become bored with the game.

The indicium shown on the cell(s) selected as the first group may be different from the indicium shown on the cell(s) selected as the second group. The controller may show indicia on the cell(s) selected as the first group and on the cell(s) selected as the second group at the same timing or at different timings.

Another aspect of the present invention may be a gaming machine including: a display which shows a plurality of columns for indicating a plurality of symbols therein; and a controller which controls the plurality of symbols indicated in the columns, implements a column-selecting stage between a primary game and a secondary game to select a column among the plurality of columns, and gives a predetermined function to the selected column in the secondary game.

By providing a game stage having a new concept of column-selection between the primary game and the secondary game, it is possible to attract the player to the selected column and the player may consider that an excellent award related to the selected column will happen. Accordingly, good feeling and new experience may be given to the player. The provision of column-selection between the primary game and the secondary game also makes it possible to provide the player with new expectation on the game results, which did not exist in the conventional gaming machines. Thus, the gaming machine including a game stage having a new concept of column-selection between the primary game and the secondary game can provide higher excitement to the player. Further, since the selected column performs the given predetermined function in the secondary game, the player can have new feeling from the secondary game even if the basic configuration of the secondary game may be the same as the conventional one. The characteristics of the secondary game can be changed significantly depending on which column has been selected and/or what function has been given to the selected column, and thus the player can play the game for an extended period of time without becoming bored. Further, the game designer can easily adjust the characteristics of the game by changing the parameters related to the column-selection, such as a frequency of occurrence of column selection, number of columns selected, and/or function provided to the selected column, for example, without modifying the basic configuration of the secondary game.

In the column selection stage, it is possible that the controller may select zero column. By this arrangement, there is a possibility that no column may be selected in the column-selecting stage. This can increase the player's pleasure when one or more columns are selected in the column selecting stage, and thus make the column selecting stage more of an entertainment.

The controller may show a plurality of symbols related with each other on the selected column. The controller may select more than one of the plurality of columns in the column-selecting stage. In the case where more than one of the columns are selected, the controller may show the same symbols with the same order on each of the selected columns on the display in the secondary game.

In one preferred embodiment, the primary game and the secondary game may be designed to perform a slot game using reel strips provided in the gaming machine. The symbols are arranged along the reel strips so that when the reels formed by the reel strips stop rotating, certain symbols are shown in the columns. The reel strips and the reels may be mechanical ones that are used in mechanical slot machines or virtual (or simulated) ones that are used in video slot machines. The reel strips may be used not only in the primary and secondary games but also in the column-selecting stage to select a column or indicate a selected column. This can be done, for example, by rotating the reels for a while and showing a predetermined symbol in the column when the rotation of the reels is stopped in the column-selecting stage. In this way, the present invention can be favorably applied to the conventional slot machines having primary and secondary games, to whereby provide the players with higher excitement owing to the column-selecting stage. Also, the reel strips used in the column-selecting stage can be different from those used in the primary and secondary games. This can be achieved in video slot machines by using different virtual reel strips (i.e., having different symbol arrangements) for the column-selecting stage and for the primary and secondary games. Of course, different reel strips may be used for the primary game and for the secondary game in video slot machines. In mechanical slot machines, a structure having outer and inner reels may be used for such purpose, where the outer and inner reels may be concentric or non-concentric. Specifically, each outer reel may be given a different symbol arrangement from that of the associated inner reel and the outer reels may be used in the column-selecting stage while inner reels may be used in the primary and secondary games, for instance.

BRIEF DESCRIPTION OF THE DRAWINGS

Other and further objects, features and advantages of the invention will appear more fully from the following description with reference to the appended drawings, in which.

DETAILED DESCRIPTION OF INVENTION

Figure 1:
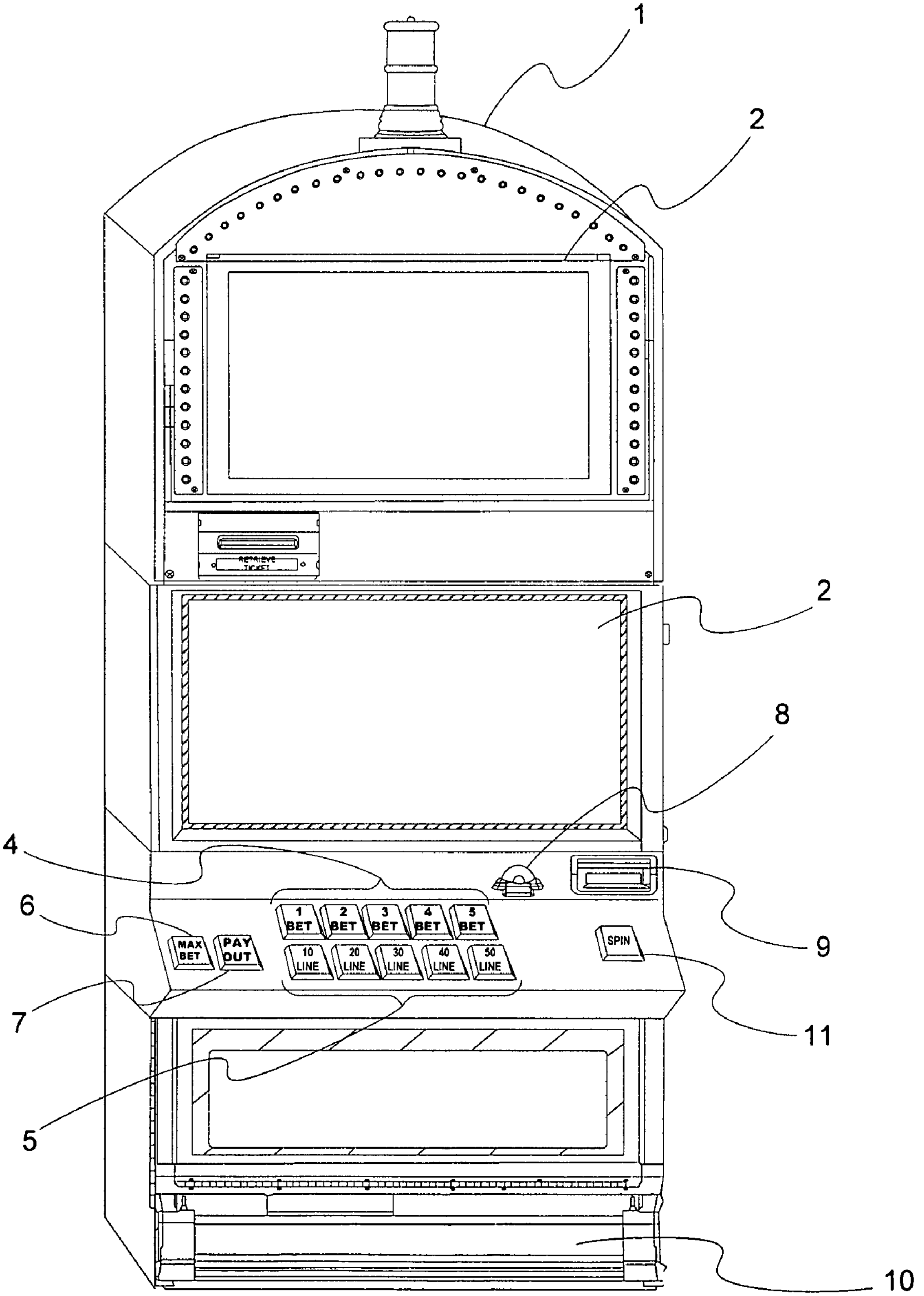
FIG. 1 is a perspective view illustrating an example of a gaming machine of the present invention.

FIG. 1 is a perspective view showing an example of a gaming machine of the present invention. This gaming machine 1 is designed as a video slot machine. As shown in FIG. 1, the gaming machine 1 is provided with two displays 2. Immediately under the displays 2, there are provided BET switches 4, selection switches 5, a MAXBET switch 6, a PAYOUT switch 7, a coin slot 8, a bill acceptor 9 and a spin button 11. The BET switches 4 are provided for selecting a wager per pay line and in this embodiment include five switches from 1BET to 5BET. The selection switches 5 are provided to determine how many pay lines should be active in each slot game and in this embodiment include five switches from 10LINE to 50LINE. A coin payout mouth 10 is provided in the lower part of gaming machine 1. The spin button 11 may be used to start a slot game executed in the gaming machine. The above-mentioned components equipped in the gaming machine 1 may be used to execute a primary game and a secondary game on the display.

The "primary game" used in this specification means a game initiated on a gaming machine at first after the gaming machine receives a bet from a player and also a game most frequently executed in an entire game executed by the gaming machine. In general, the primary game may be any game such as a slot game, a poker game or a roulette game.

The "secondary game" used in this specification means a game secondly executed in an entire game executed in the gaming machine when a predetermined condition is satisfied. Whether the predetermined condition is satisfied or not may depend on a result of a primary game or may not depend on the result of the primary game. The gaming machine used in game business in recent years is likely to be configured to be able to execute the primary game and the secondary game. The secondary game is generally executed in order to provide a bonus to the player and therefore, it may be called "a bonus game". Thus, an award of the secondary game is generally higher than that of the primary game in average. Also, a probability of winning in the secondary game is generally higher than that in the primary game in average. The secondary game may be configured by the same kind of game as the primary game. For example, slot games may be executed both as the primary game and as the secondary game. Alternatively, the secondary game may be configured by a different kind of game from the primary game. Typically, the secondary game is a free game, i.e., executed without receiving a bet from a player.

The displays 2 are adapted to display information required by the player to play a game. For example, such information may include symbols used in the slot game, selected wager per pay line, activated pay lines, etc. The information may also include an indication to prompt a player to make certain choices in a progressive game if the gaming machine 1 is adapted to provide a progressive game. The "progressive game" is a game having a progressive award which is gradually updated according to a player's bet. In general, the progressive game has some kinds of progressive awards, and one of the progressive awards is selected to pay out to a player if the player wins the game. In such a case, the displays 2 may also display the amount of each kind of progressive awards that the player has a chance to obtain. Moreover, information that corresponds to a status of the progressive game, a credit that the player has input into the gaming machine 1, and play history of the player may be displayed on the displays 2. It should be noted that in general, the information provided by the displays 2 can change depending on the game that the gaming machine 1 provides. For example, if the gaming machine 1 is adapted to provide a card game, the information may include images of cards, and if the gaming machine 1 is adapted to provide a roulette game, the information may include an image of the roulette.

As mentioned above, the BET switches 4 are switches for inputting a wager in each game. As is well known, if one credit (or unit of bet) is 5 cents, for example, the player can select 5 cents/line by pushing 1BET switch, and 10 cents/line by pressing 2BET switch, and so on. The selection switches 5 are switches that can be used for determining how many pay lines should be active in each slot game, as mentioned above. However, the switches 5 may also be used to select a card or cards, which the player wants to discard, in the case where the gaming machine 1 provides a card game (in the porker game, for example, 10LINE switch may be used to indicate the left-end card to be discarded, 20LINE switch may be used to indicate the card on the right of the left-end card, and so on.). The number of BET switches 4 and selection switches 5 may not be limited to five, but may be any suitable number. The gaming machine 1 may additionally have a switch for casting a bet as an extra bet.

The MAXBET switch 6 is a switch for inputting the maximum bet that a player can spend at a time in a single game. The PAYOUT switch 7 is a switch to be operated by the player when the player wants to quit the game and collect the amount of money which has been credited onto the gaming machine 1. The coin slot 8 is a hole for receiving coins as credit for playing the games. The bill acceptor 9 is a hole used to accept a bill or a cash card as credit for playing the games, or to pay out the amount of money, which has been credited in the gaming machine 1, to the player. The coin payout mouth 10 is a tray to pay out a player the amount of money which has been credited in the gaming machine 1.

The gaming machine 1 related to the present invention is not limited to the above, but it may have other various functions, and/or some of the above-mentioned functions may be omitted. For example, the gaming machine 1 may have a lighting apparatus for providing illumination in a color or a plurality of colors when the player proceeds into the bonus game or secondary game, for example. The gaming machine 1 may also have an apparatus for outputting music or any other sound and/or an apparatus for vibrating the whole gaming machine, when the player proceeds into the secondary game, for example. The gaming machine 1 may have three or more displays or only a single display. The gaming machine 1 may have a REPEAT switch for choosing the bet per line and number of activated pay lines that the player selected in the last game again.

Reels, roulette, etc., which are used in the game, may not necessarily be those displayed on the display. A stepper (mechanical reels), mechanical roulette, etc. may be mounted in the gaming machine 1 instead of or in addition to images of the reels, roulette, etc. There may be a display etc., which is used in a plurality of gaming machines in common.

Figure 2:
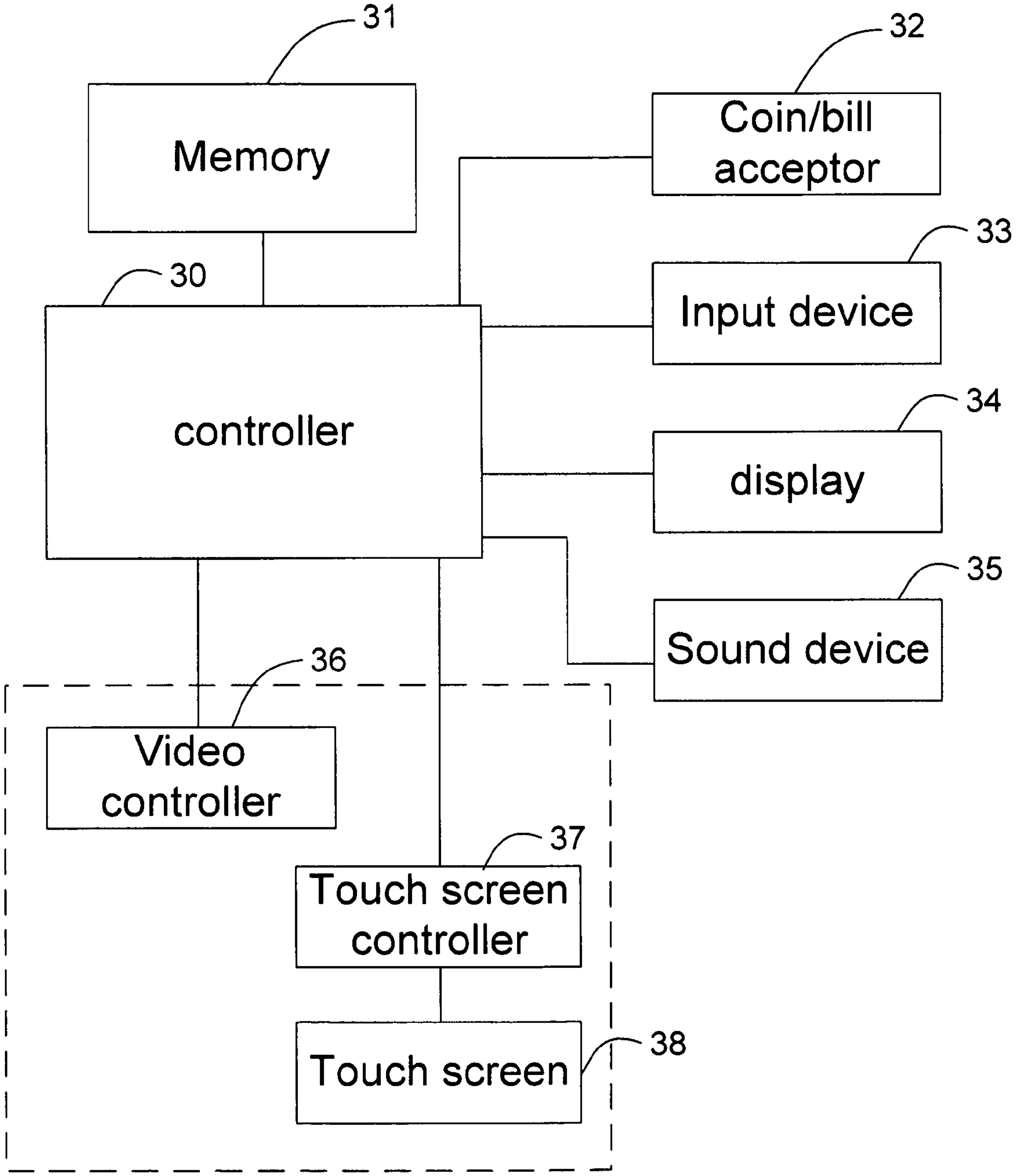
FIG. 2 is a block diagram illustrating an example of a gaming machine of the present invention.

FIG. 2 is a block diagram illustrating an example of an operational structure of the gaming machine 1 of the present invention. The gaming machine 1 is configured with a controller 30, a memory 31, a coin/bill acceptor 32, an input device 33, a display 34, a sound device 35, a video controller 36, a touch screen controller 37 and a touch screen 38. The memory 31 stores information regarding a game status, a game program and data. The coin/bill acceptor 32 equipped as the coin slot 8 and the bill acceptor 9 of FIG. 1 receives a coin or a bill from a player. The input device 33, which is equipped as the BET switches 4, the selection switches 5, the MAXBET switch 6, the PAYOUT switch 7 and the spin button 11 of FIG. 1, receives an operation from the player and transmits the operation to the controller 30. The display 34 corresponding to the display 2 in FIG. 1 indicates information regarding a game. The sound device 35 can be used to make a sound to excite the player. The video controller 36 may be used to process a game image to be displayed on the display 34. The touch screen controller 37 controls the touch screen 38, which can be disposed over the display 2 in FIG. 1 to receive an operation from the player. The controller 30 is connected to the memory 31, the coin/bill acceptor 32, the input device 33, the display 34, the sound device 35, the video controller 36 and the touch screen controller 37, to process information received from these component parts and control them to carry out the game provided by the gaming machine 1.

Next, an operation of the gaming machine 1 of the present invention will be explained with respect to a preferred game executed by the gaming machine 1. The game to which the present invention may be applied is typically configured as a slot game including a primary game and a secondary game in which symbols are shown in a plurality of cells or columns. According to the present invention, a cell-selecting stage or a column-selecting stage is performed during the period between the primary game and the secondary game. Details of the present invention will be described below with reference to exemplary game screens shown in the drawings.

Figure 3:
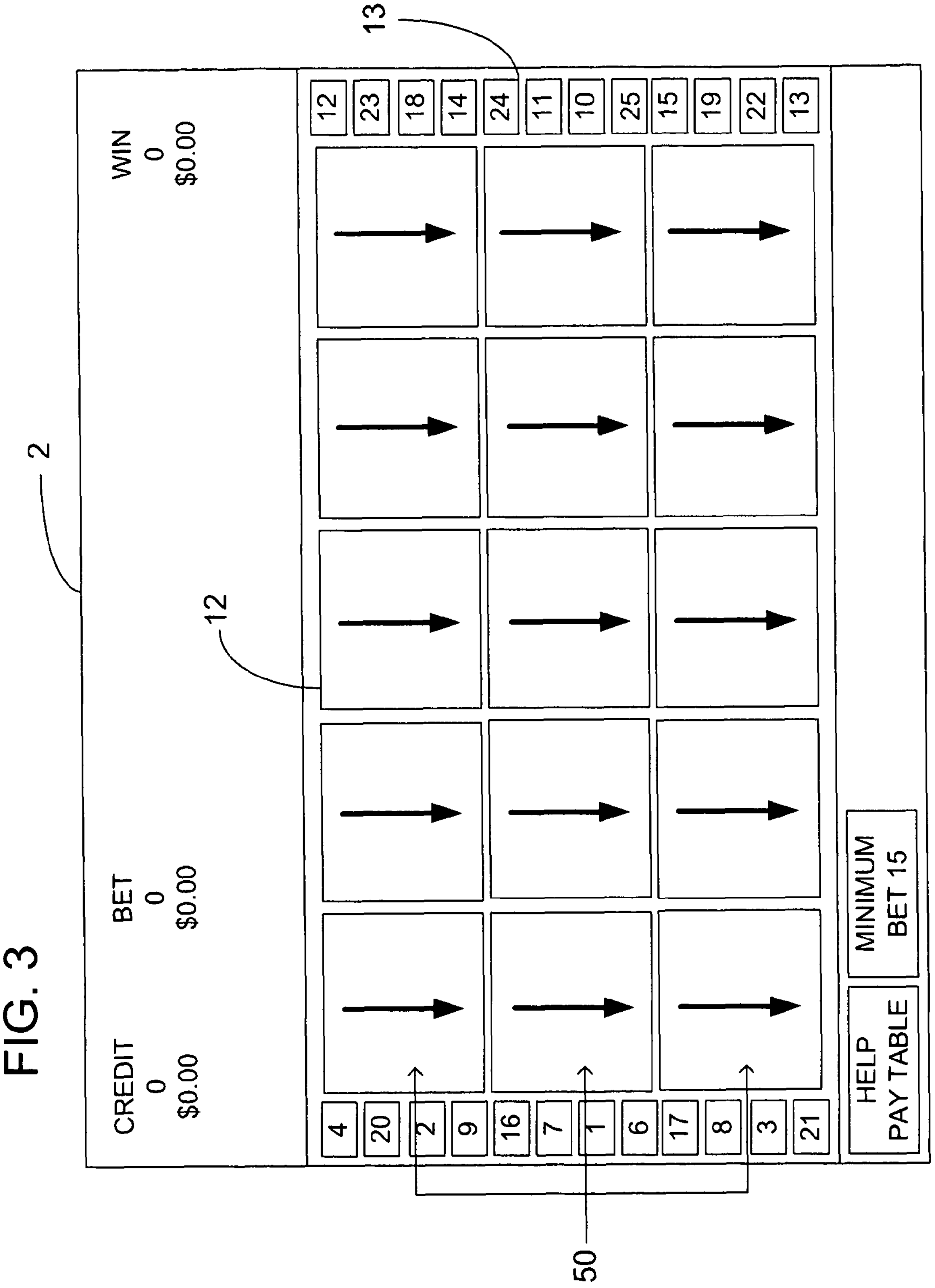
FIG. 3 is a diagram illustrating a state of an exemplary game executed by the gaming machine pertaining to the present invention.

One embodiment of the game, which is executed by the gaming machine 1 pertaining to the present invention, is illustrated in FIGS. 3-7. FIG. 3 illustrates a game screen during the primary game executed by the gaming machine 1, which in this embodiment is a video slot machine. In FIG. 3, each of fifteen cells 12 having a rectangular shape is indicated on the display 2. The cells 12 are arranged in a 3×5 matrix and three of those cells 12 aligned in a vertical direction of the drawing configure a column 50. In this embodiment, each of the cells 12 has an image of a reel (which may be called a virtual reel or simulated reel) therein. The virtual reel is associated with or configured by a virtual reel strip along which symbols are arranged. In other words, each virtual reel has predetermined symbols stop positions like physical reels. When the controller 30 receives instructions from the player to start the slot game, the controller 30 starts a primary game. In the primary game, the controller 30 controls the display 2 to rotate the reels in the cells 12 on the display 2, as indicated by downward arrows in FIG. 3. It should be noted that this may be also expressed as "the controller 30 rotates the symbols" in this specification. The rotation of symbols continues for a while but will eventually stop and a symbol is displayed on each cell 12. In this embodiment, the cells 12 are independent from each other, which mean that the stop position and resulting symbol for the reel in each cell 12 is randomly decided by the random number generator independently from the others.

Figure 4:
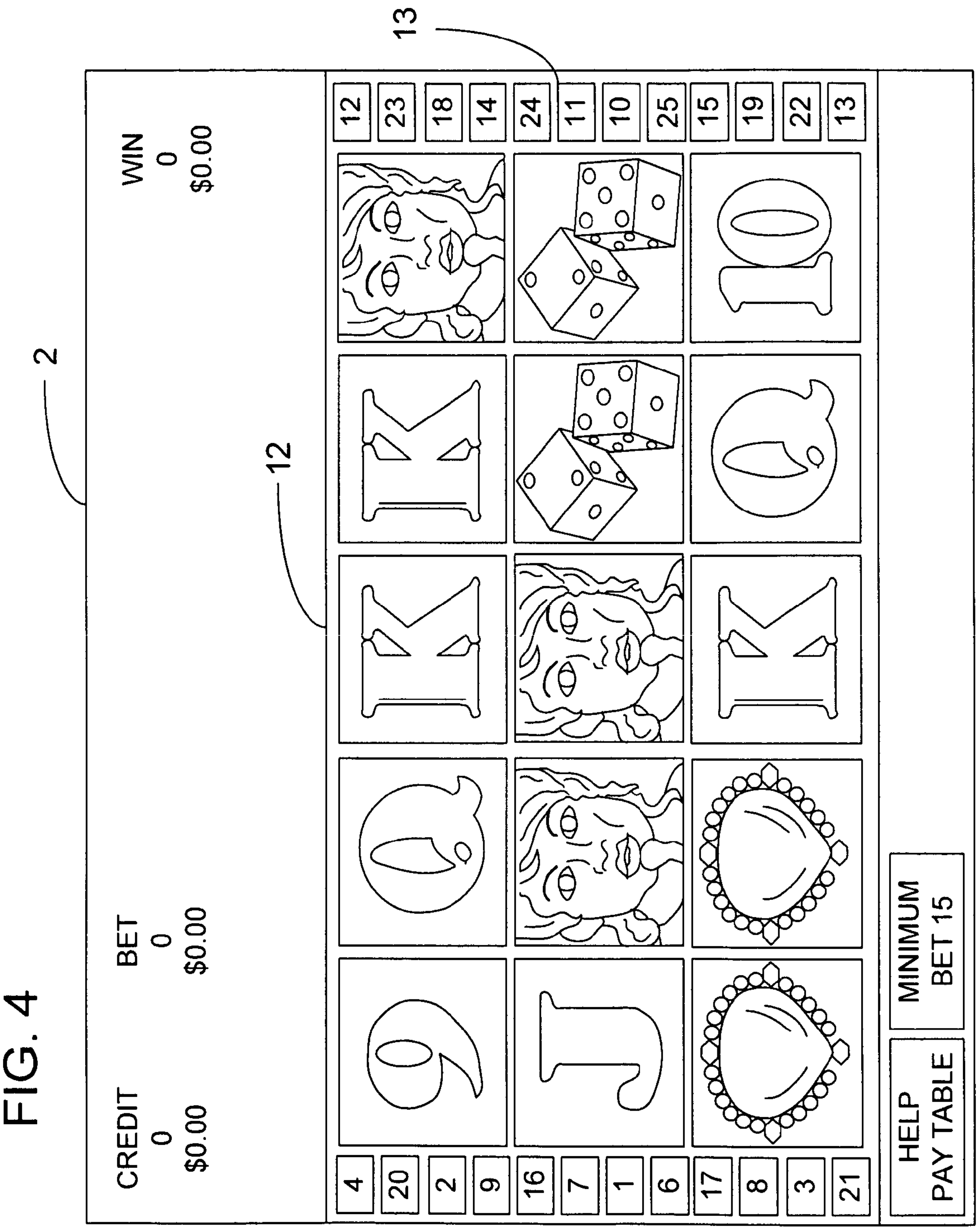
FIG. 4 is a diagram illustrating a state where a game situation shown in FIG. 3 has progressed further.

FIG. 4 illustrates a state where the symbols shown in FIG. 3 have stopped rotating and a symbol is displayed on each cell 12. Then, whether a prize should be paid out or not is determined by determining whether these symbols form one or more winning combinations on pay lines 13. Further, it is determined whether or not a predetermined condition for starting a secondary game is met. For example, such a predetermined condition may be that a winning combination is formed on at least one of predetermined pay lines 13 at the time when the symbols stopped rotating, or that more than one predetermined symbol are displayed on the cells 12 (such a predetermined symbol may be called a "scatter symbol", "bonus symbol", "bonus trigger symbol" or a "bonus feature symbol"). The predetermined condition for starting the secondary game may not be related to the outcome of the primary game. When it is found that the predetermined condition is met, the controller 30 executes a cell-selecting stage before starting the secondary game.

Figure 5:
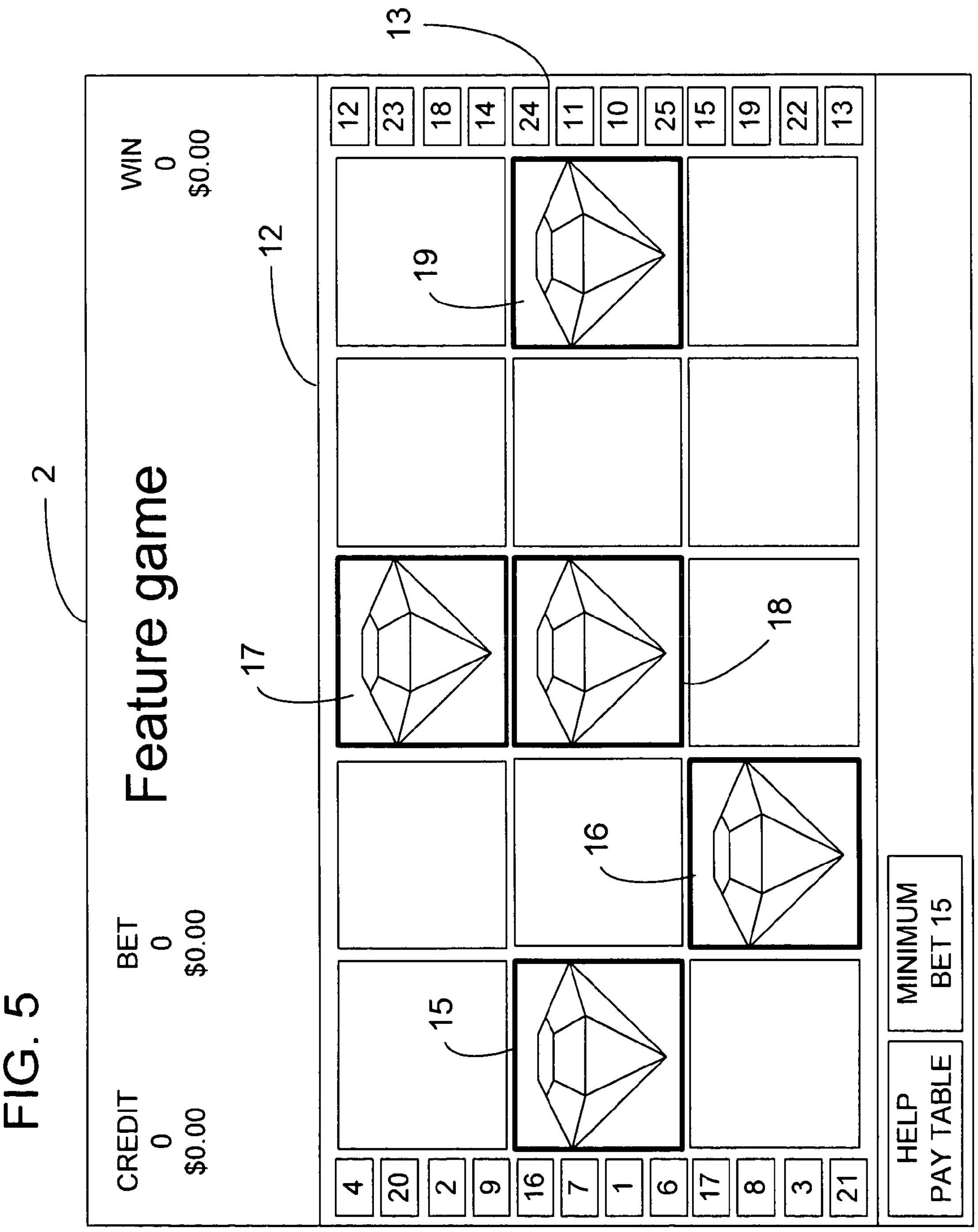
FIG. 5 is a diagram illustrating a state where a game situation shown in FIG. 4 has progressed further.

FIG. 5 illustrates a state where the controller 30 is executing the cell-selecting stage. In the cell-selecting stage, normally, the controller 30 randomly selects one or more cells 12 based on a random number at first. When the cell or cells are selected, the controller 30 displays a certain indication on the selected cell or cells. For example, a predetermined symbol (diamond symbol in FIG. 5) may be displayed in the selected cell or cells. In FIG. 5, cells 15-19 are the selected cells. A player is able to recognize the selected cells by seeing the diamond symbols displayed in the cells 15-19. On the other hand, there may be no indication in the cells which were not selected by the controller 30. The predetermined symbol may be such a symbol that is not used in the primary and/or secondary games. In other words, the reel strip used in the cell selection stage may have a different symbol sequence from the reel strips for the primary and/or secondary games. Further, instead of or in addition to showing a predetermined symbol in the selected cells, other methods for indicating the selected cell may be adopted. Such a method may include showing the boundary of the selected cell in a different color from that of the non-selected cells or showing the symbol in the selected cell with a background having a different color from that in the non-selected cells, for example.

As another method for the cell-selection, the game may be set up so that a player is allowed to select the cells. For example, when the player touches the cells on the display 2, the touch screen 38 recognizes the touch and sends an electric signal to the controller 30 through the touch screen controller 37. The controller 30 may be arranged to receive the electric signal to select the cells 12, which were specified by the player.

In the above cell-selecting stage, the number of cells 12 selected in the selecting stage may be any number not exceeding the number of the entire cells. However, in order to make the game more exciting, it is preferred to select a plurality of cells 12. Also, the controller 30 may be adapted to proceed to the secondary game without selecting a cell 12 in the cell-selecting stage with a certain probability. If no cell has been selected, the executed secondary game will be no different from the conventional one.

In the case where the controller 30 selects a plurality of cells 12, preferably, the controller 30 selects about ¼-¾ of the entire cells 12. More preferably, the controller 30 selects about ⅓-⅔ of the entire cells 12. This is because when the number of the selected cells is too small or too large (i.e., less than ¼ or more than ¾ of entire cells 12), it may become hard for the player to recognize the selected cells 12.

The number of the cells 12 displayed on the display 2 may not be limited to 15 but can be any number. The cells 12 can be arranged in any matrix such as "3×3", "3×4", "3×5", "4×5", or "5×5", for example. Further, the cells 12 may not be necessarily arranged in a matrix pattern but may be arranged in any pattern. For example, the cells 12 may be arranged to form five columns such that the first, third and fifth columns from the left each contain three cells 12 while the second and fourth columns each contain four cells 12. In this case, the cells 12 are not arranged in line in a horizontal direction (i.e., in a direction perpendicular to an extension of columns). Further, the shape of the cells 12 may not be limited to the rectangular shape, but may be of any shape such as circle, square or any other polygonal shape.

In the above-mentioned cell selecting stage shown in FIG. 5, the predetermined symbol may also be lit up on the selected cells 12. Also, the display of the predetermined symbol in the selected cells 12 may be conducted together with some visual and/or audio effects to make the cell-selection more impressive to the player. For example, an illumination device may be provided to the gaming machine 1 to generate a color light when the predetermined symbol is displayed on the selected cell 12. Alternatively or in addition, the sound device 35 equipped to the gaming machine 1 can produce appropriate sounds when the predetermined symbol is displayed on the selected cell 12.

The above-mentioned cell-selecting stage is not limited to taking place only one time between the primary game and the secondary game. For example, if the secondary game is a free spin game, a plurality of reel spins may be performed in the secondary game. In this case, the above-mentioned cell-selecting stage may be performed every time before conducting each reel spin in the secondary game. The cells selected before conducting a reel spin may show the same symbols or mutually related symbols in the reel spin until the next cell-selecting stage is started before the next reel spin.

In a case when the above-mentioned cell-selecting stage is executed a plurality of times, the number of the cells to be selected may differ from the number of the cells selected last time in the previous cell-selecting stage. For example, the number of the cells selected may change for every cell-selecting stage, or the number of the selected cells may increase compared with the selected cells in the previous cell-selecting stage. The above-mentioned cell-selecting stage may be executed any time, such as at a stage before or while the primary game is executed.

By the way, in the present specification, the cell-selecting stage may be referred to as "a feature game". The "feature game" used in this specification means a game executed between the primary game and the secondary game.

Figure 6:
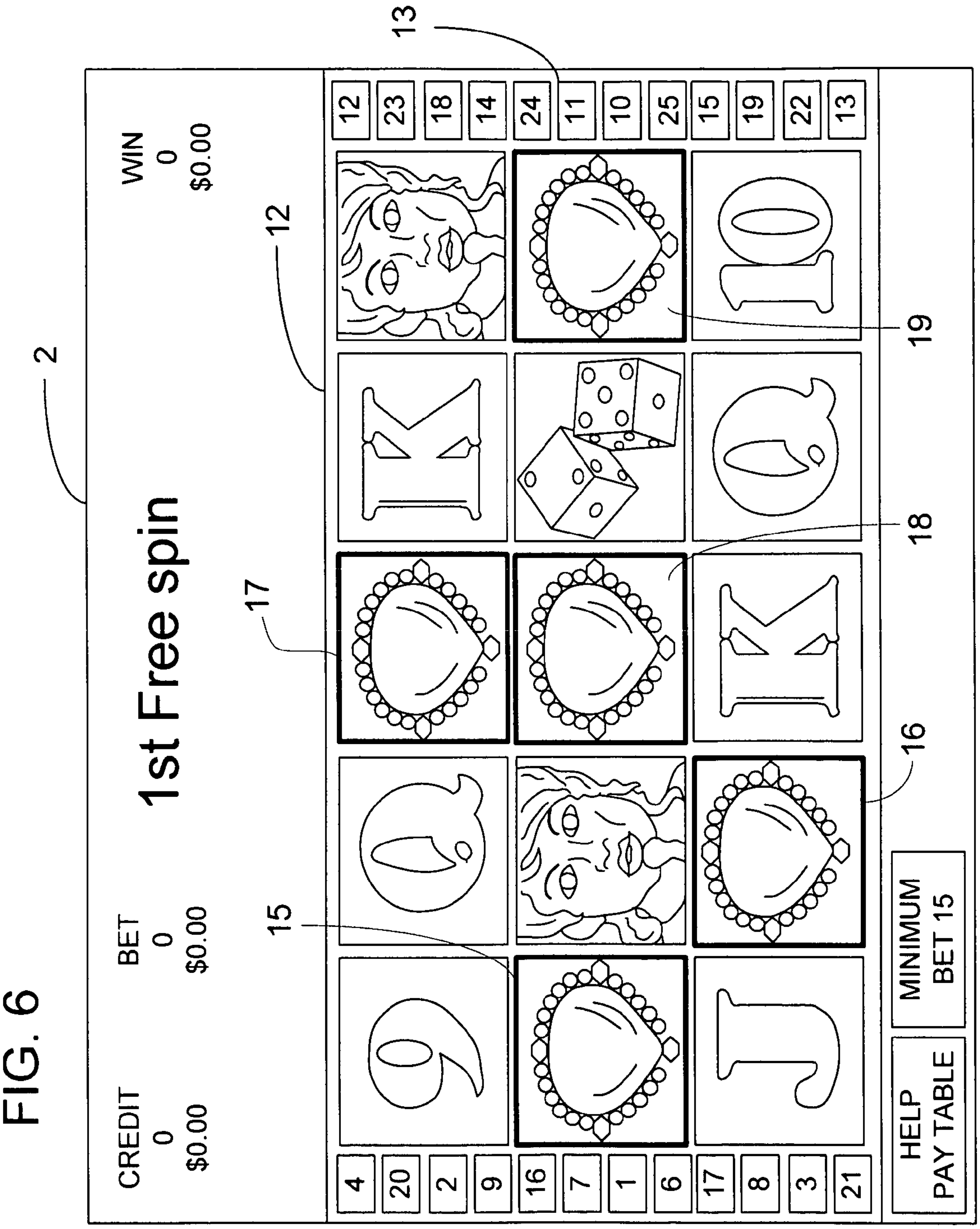
FIG. 6 is a diagram illustrating a state where a game situation shown in FIG. 5 has progressed further.

FIG. 6 is a diagram illustrating a state where a game situation shown in FIG. 5 has progressed further. FIG. 6 illustrates a state where the controller 30 is executing a free game as the secondary game.

The "free game" used in this specification means a game executed on a gaming machine without receiving a bet from a player. When the free game is a slot game or a series of slot games (or reel spins), the game may be called a "free spin game" or "free spin". The term "free spin game" or "free spin" basically refers to an entire game including the plurality of reel spins but may sometimes refer to each one of the plurality of reel spins, and thus the meaning of the "free spin game" or "free spin" may change depending on the context of the specification. When the free spin game is conducted, an amount of award resulting from symbol indication is computed for every reel spin and a total amount of those awards is eventually paid out to the player. The number of the reel spins may be increased or decreased during the free spin game according to a predetermined condition.

In the free spin game of this embodiment, a plurality of free slot games is automatically conducted. FIG. 6 shows a state at the time when the controller 30 has stopped the rotation of symbols in the first one (1st Free spin) of such plurality of free slot games of the free spin game. According to the present invention, in the secondary game, a predetermined function is provided to the cells selected in the cell-selecting stage (or feature game). In the embodiment shown in FIG. 6, the same "jewelry symbols" are displayed on cells 15-19 selected in the feature game. Thus, the same symbols or the related symbols with each other are displayed on the selected cells 15-19.

Figure 7:
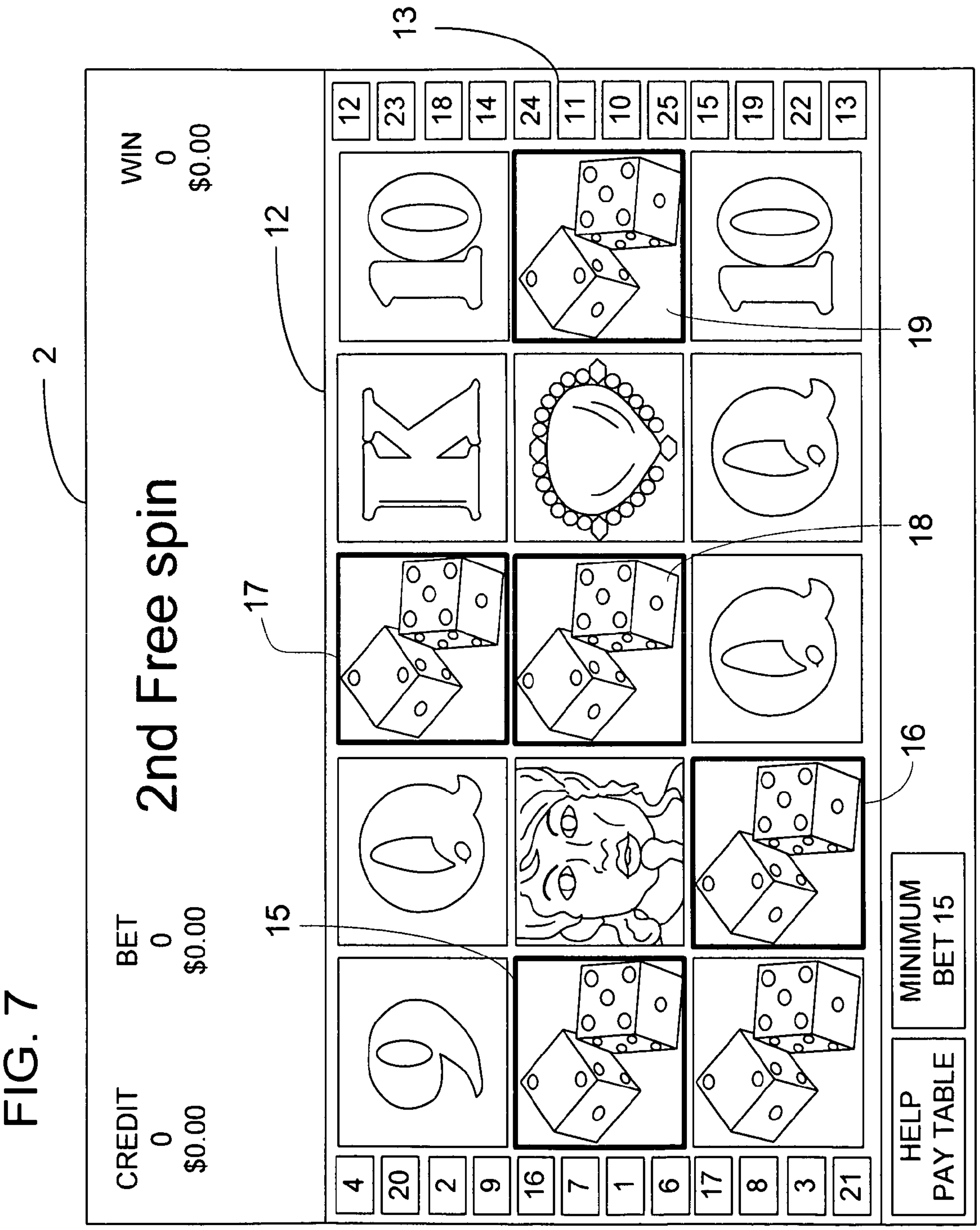
FIG. 7 is a diagram illustrating a state where a game situation shown in FIG. 6 has progressed further.

FIG. 7 is a diagram illustrating a state where the game situation shown in FIG. 6 has progressed further. A state after the controller 30 has performed the rotation of symbols in the second free slot game (2nd Free spin) in the free spin game is illustrated in FIG. 7. In the same fashion as in FIG. 6, the same symbols are displayed on the cells 15-19 selected in the feature game in FIG. 7. However, in FIG. 7, "dice symbols" are displayed on the selected cells instead of the "jewelry symbols". The symbol rotation of third free slot game onward of the free spin game is executed in the similar manner as mentioned above. Different symbols may be displayed in the selected cells for different free slot games in the free spin game, such as the "jewelry symbols" for the first free slot game and the "dice symbols" for the second free slot game, as described above. Alternatively, the same symbol may be displayed for different free slot games in the free spin game, such as the "jewelry symbols" for both of the first and second free slot games.

Figure 8:
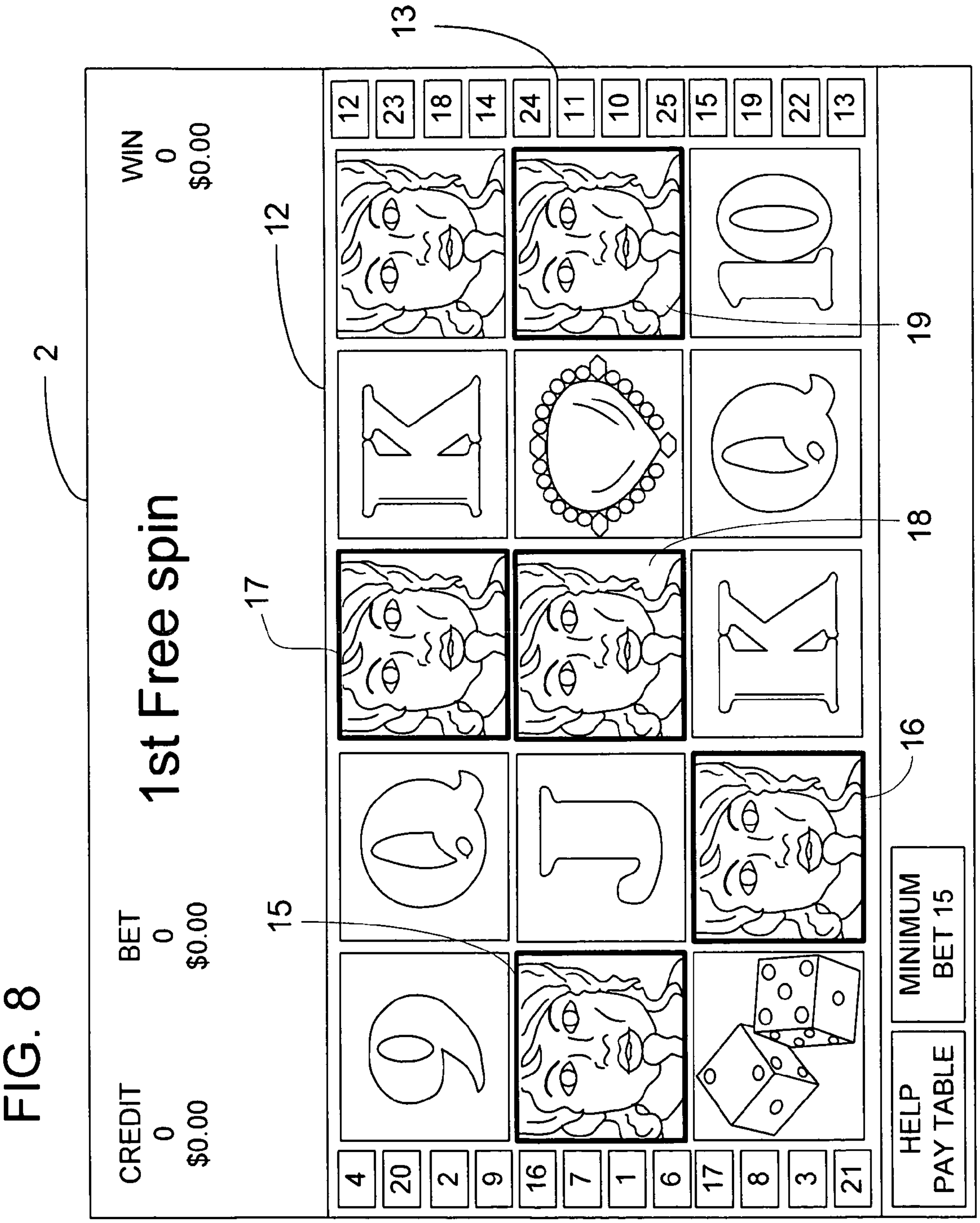
FIG. 8 is a diagram illustrating another example of a game executed by the gaming machine pertaining to the present invention.
Figure 9:
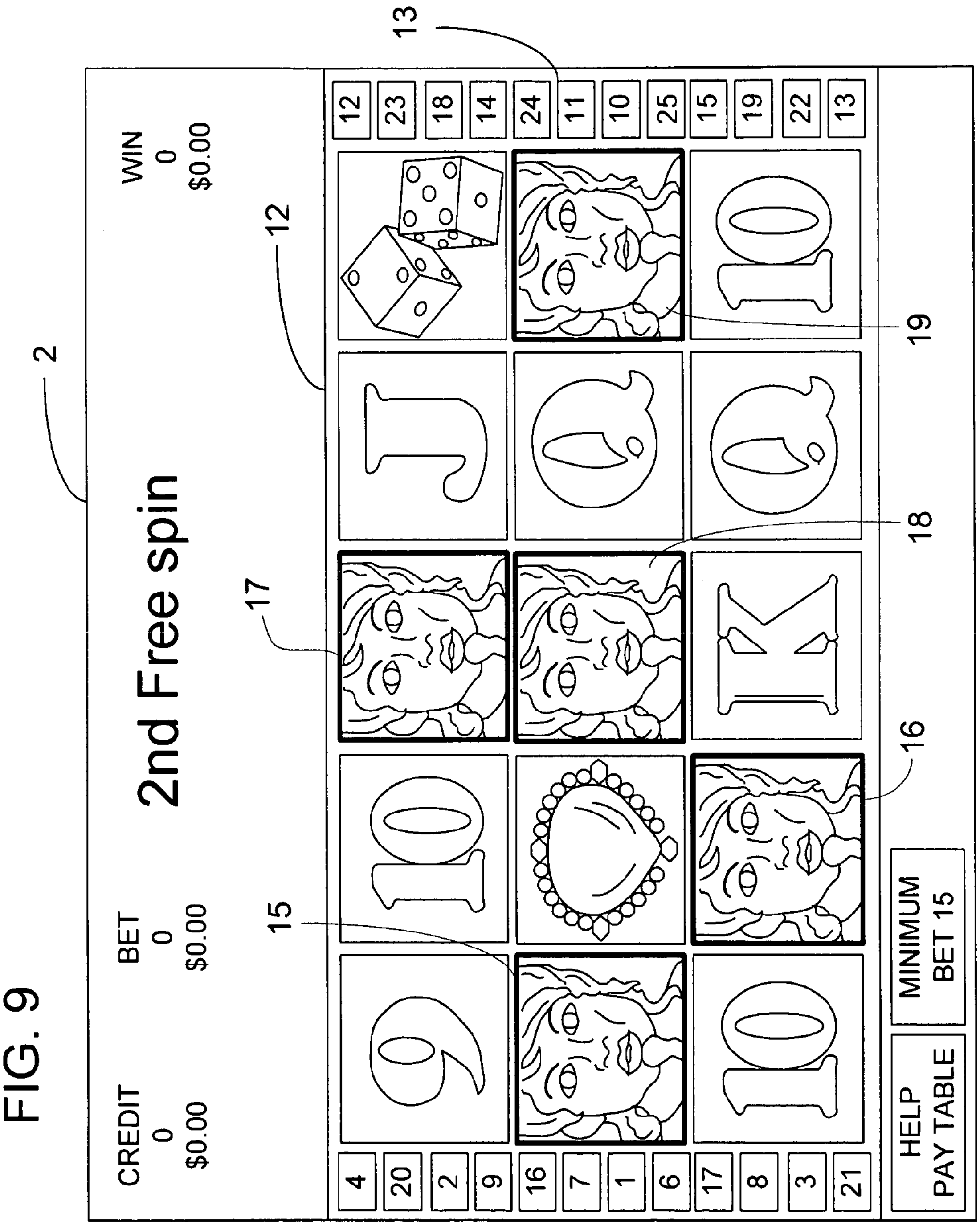
FIG. 9 is a diagram illustrating a state where a game situation shown in FIG. 8 has progressed further.

Next, another embodiment of the game, which is executed by the gaming machine pertaining to the present invention, will be described in reference to FIGS. 8 and 9. FIGS. 8 and 9 also illustrate a free spin game as the secondary game. The cells 15-19 are the cells selected in the feature game. FIG. 8 illustrates a state in which the controller 30 has stopped the symbol rotation after rotating the symbols for the first free slot game (or 1st Free spin) in the free game. In this embodiment, the free spin game is designed such that only the wild symbols (in this embodiment, indicated by a figure of a woman face) are displayed on the selected cells. Therefore, as shown in FIG. 8, the wild symbols are displayed on all of the selected cells 15-19.

FIG. 9 illustrates a state after the controller 30 has performed the symbol rotation for the second free slot game (or 2nd Free spin) in the free game. Also in this figure, the wild symbols are displayed on all of the selected cells 15-19. That is because the free spin game is designed so that symbols other than the wild symbols may not be displayed on the selected cells. Thus, the game can be set up so that the wild symbols are displayed on the selected cells throughout the entire free spin game.

Figure 10:
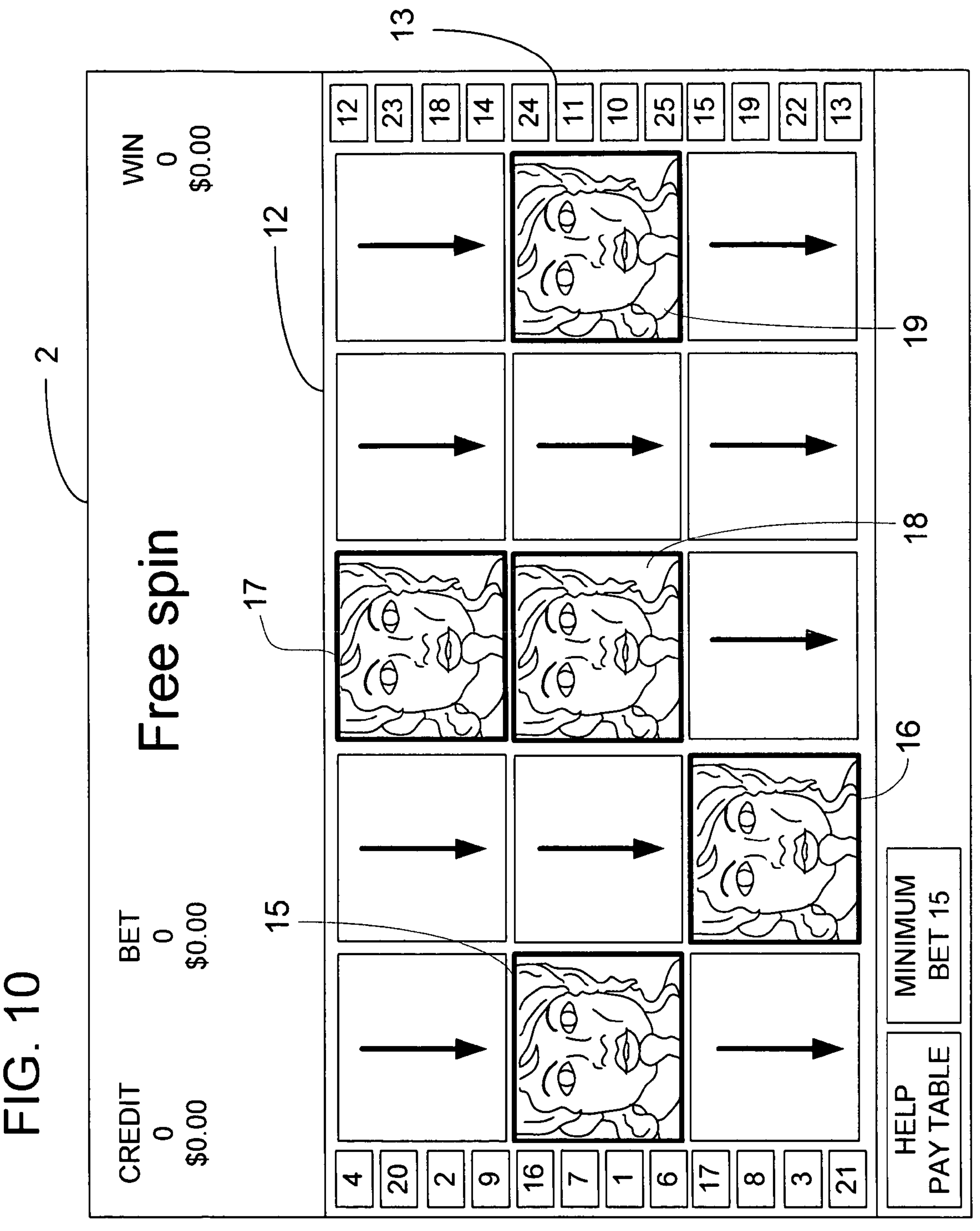
FIG. 10 is a diagram illustrating yet another example of a game executed by the gaming machine pertaining to the present invention.
Figure 11:
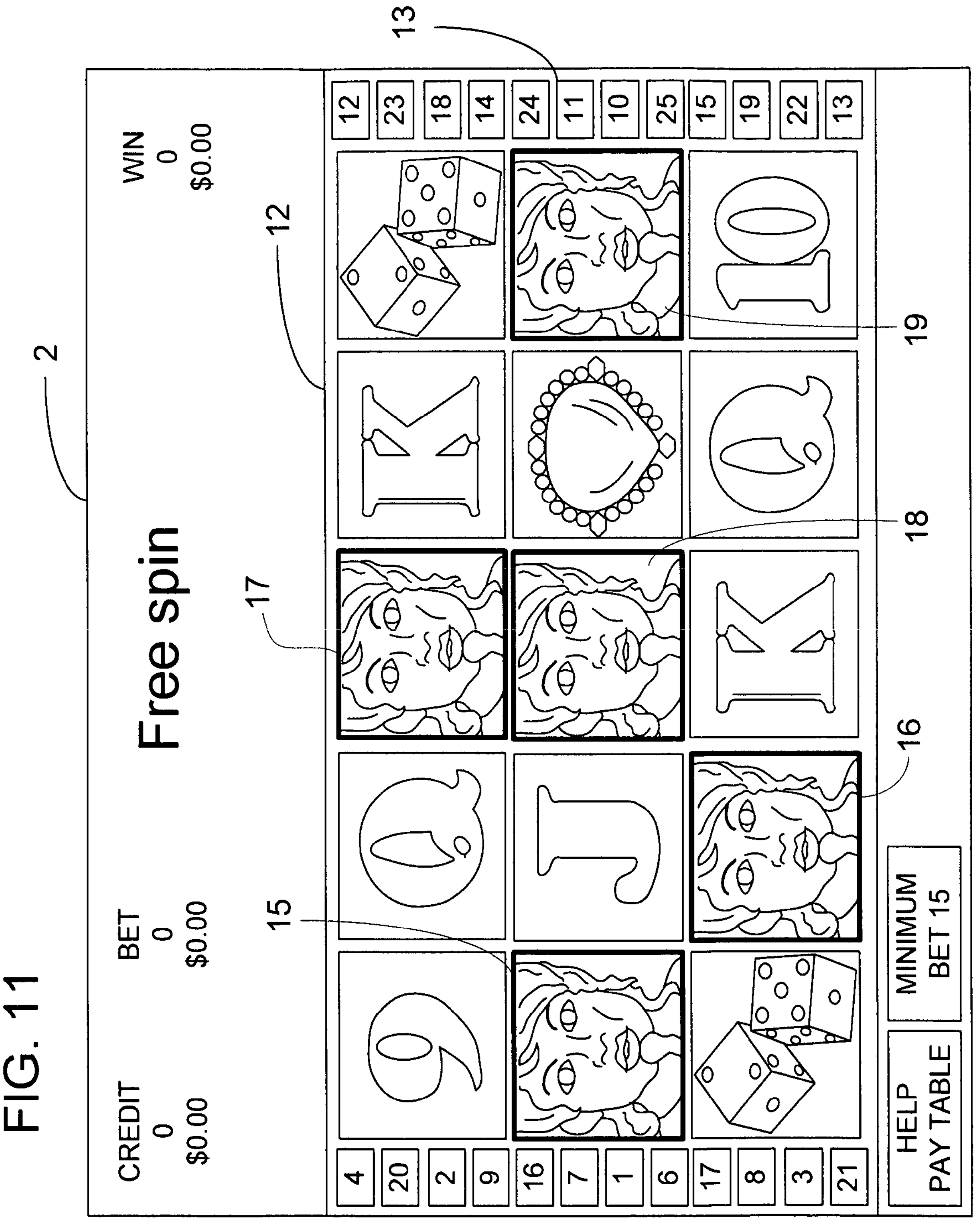
FIG. 11 is a diagram illustrating a state where a game situation shown in FIG. 10 has progressed further.

Next, another embodiment of the game, which is executed by the gaming machine pertaining to the present invention, will be described in reference to FIGS. 10 and 11. FIGS. 10 and 11 also illustrate a free spin game. In this embodiment, as well as the above-described embodiments, the cells 15-19 are the cells selected in the feature game. FIG. 10 illustrates a state where the controller 30 has stopped the symbols in each cell once, and then, further rotates the symbols in the non-selected cells after the wild symbols are displayed on the selected cells 15-19. The symbol rotations in the non-selected cells are shown by downward arrows in FIG. 10. In FIG. 10, the symbols in the selected cells 15-19 are not rotating, and the wild symbols are displayed steadily on the selected cells 15-19. Then, subsequently, the controller 30 stops the symbol rotation on the non-selected cells and the display 2 may be in the state illustrated in FIG. 11. As shown in FIGS. 10 and 11, when performing the free spin game using the selected cells, the symbols displayed on the selected cells may not rotate, and may be fixedly displayed continuously. The free spin game may be executed by rotating and displaying the symbols displayed on the cells other than the selected cells.

As described above, a cell-selecting stage is provided before the controller 30 starts the secondary game (for example, a free spin game). According to the present invention, the selected cell(s) are given a predetermined function. In one preferred embodiment, the controller 30 displays a predetermined symbol on the selected cell(s). The symbol, which the controller 30 displays on the selected cell(s), may be any symbol. For example, the symbol on the selected cell(s) may be a special symbol, such as a wild symbol or a scatter symbol. In another example, the symbols, which the controller 30 displays on the selected cells, may be special symbols that are not used in the primary game. What the special symbols are may be decided based upon a game designer's discretion. For example, the special symbol may be a picture symbol "A" that does not appear in the primary game. In another example, the symbols displayed on the selected cells may be related to each other. Further, the symbols displayed on the selected cells may be the same with each other. On the other hand, the symbols displayed on the cells which the controller 30 did not select may be determined by the controller 30 so as to achieve a predetermined payout rate.

The "symbols related to each other" here refers to symbols having a relation, which a game designer arbitrarily defined, with the other symbol. The relation is not only limited to a case of two or more symbols having a common characteristics or attribution. That is, for example, a case where two or more symbols have a common appearance, a common attribution, etc., such as a "number", the "alphabet", etc., is not the only case that is included in "the related symbol" here. Two or more symbols, which have the relation that a game designer arbitrarily defined, are included in the "related symbols" here.

Examples of the "related symbols" will be described below. For example, there are cases where only the high reward symbols are displayed on the selected cells, where only the low reward symbols are displayed on the selected cells, where only the symbols, which have a special function, are displayed on the selected cells, where only the symbols, which are capable of increasing the number of free games, are displayed on the selected cells, where only the symbols, which have a function to payout an additional reward, are displayed on the selected cells, etc. The high reward symbols and the low reward symbols may be decided based upon designer's discretion. For example, the high reward symbols may be symbols to compose the first highest reward or the second highest reward. The low reward symbols may be symbols to compose a reward except for the first highest reward or the second highest reward.

As mentioned above, the free spin game is a game that is usually positioned as a bonus game, and may comprise a plurality of reel spins. In the above embodiments shown in FIGS. 3-11, the cell-selection stage was provided before entering the free spin game, and the selected cells 15-19 were the same for different reel spins in the free spin game. However, the execution of the above-mentioned cell-selecting stage is not limited to one time before the free spin game. For example, the cell-selecting stage may be provided between every adjacent reel spins of the free spin game. In each reel spin, the same or the related symbols may be displayed on the cells selected in the immediately preceding cell-selecting stage. Also, the number of cells selected in the cell-selecting stages may differ from one cell-selecting stage to another. For example, in a case where the cell-selecting stage is executed two times (two cycles) in the free spin game, three cells may be selected in the cell-selecting stage in the first cycle and two cells may be selected in the cell-selecting stage in the second cycle. The above-mentioned cell selecting stage may be executed for any number of times in the free spin game. The free spin game may be interrupted by the cell-selecting stage any number of times. If the cell-selecting stage is executed many times in the free spin game, the game can be made more active.

In a case when the reel spins (or symbol spins) in the free spin game is to be executed many times (for example, 20 times or more, or 30 times or more), it is preferable to execute the above-mentioned cell-selecting stage in between the symbol spins in the free spin game. In a case when the above-mentioned cell-selecting stage is executed a plurality of times, the cells which differ from the last selected cells in a previous cell-selecting stage may be selected. In a case when the above-mentioned selecting stage is executed a plurality of times, the symbols which differ from the last selected symbols in a previous cell-selecting stage may be displayed on the cells.

Figure 12:
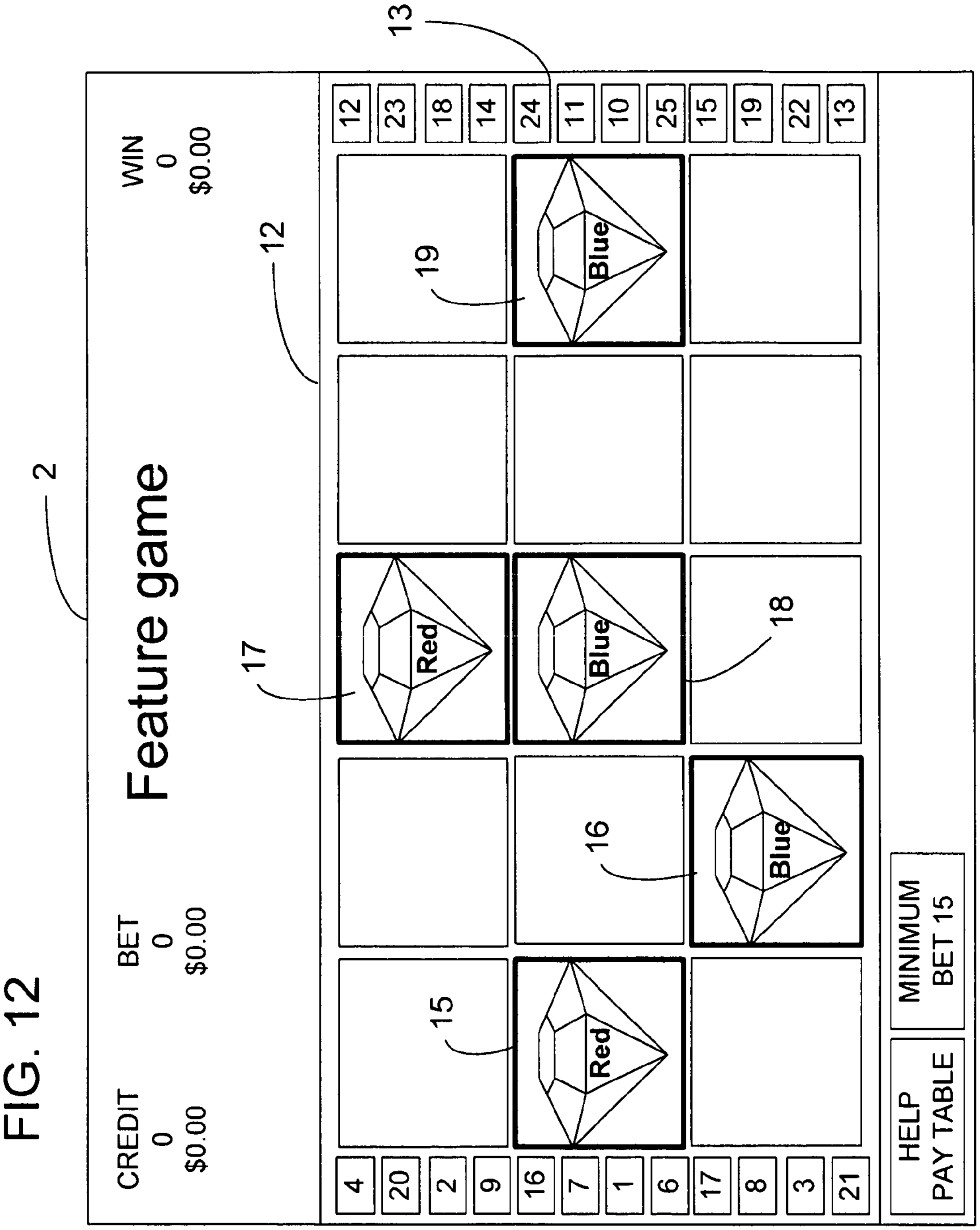
FIG. 12 is a diagram illustrating still another example of a game executed by the gaming machine pertaining to the present invention.

Next, another embodiment of the game, which is executed by the gaming machine pertaining to the present invention, will be described in reference to FIGS. 12-14. FIG. 12 illustrates another embodiment of the feature game for selecting the cells, to which a predetermined function is given in the secondary game. In this embodiment also, the cells 15-19 are the selected cells. In FIG. 12, however, red diamonds are displayed on the selected cells 15 and 17 while blue diamonds are displayed on the cells 16, 18, and 19. This means that the cells selected by the controller 30 are divided into two groups. In other words, the first group of selected cells (cells 15 and 17) are indicated with the red diamond symbol while the second group of selected symbols (cells 16, 18 and 19) are indicated with the blue diamond symbol. Thus, different groups of selected cells can be indicated by different indications.

Figure 13:
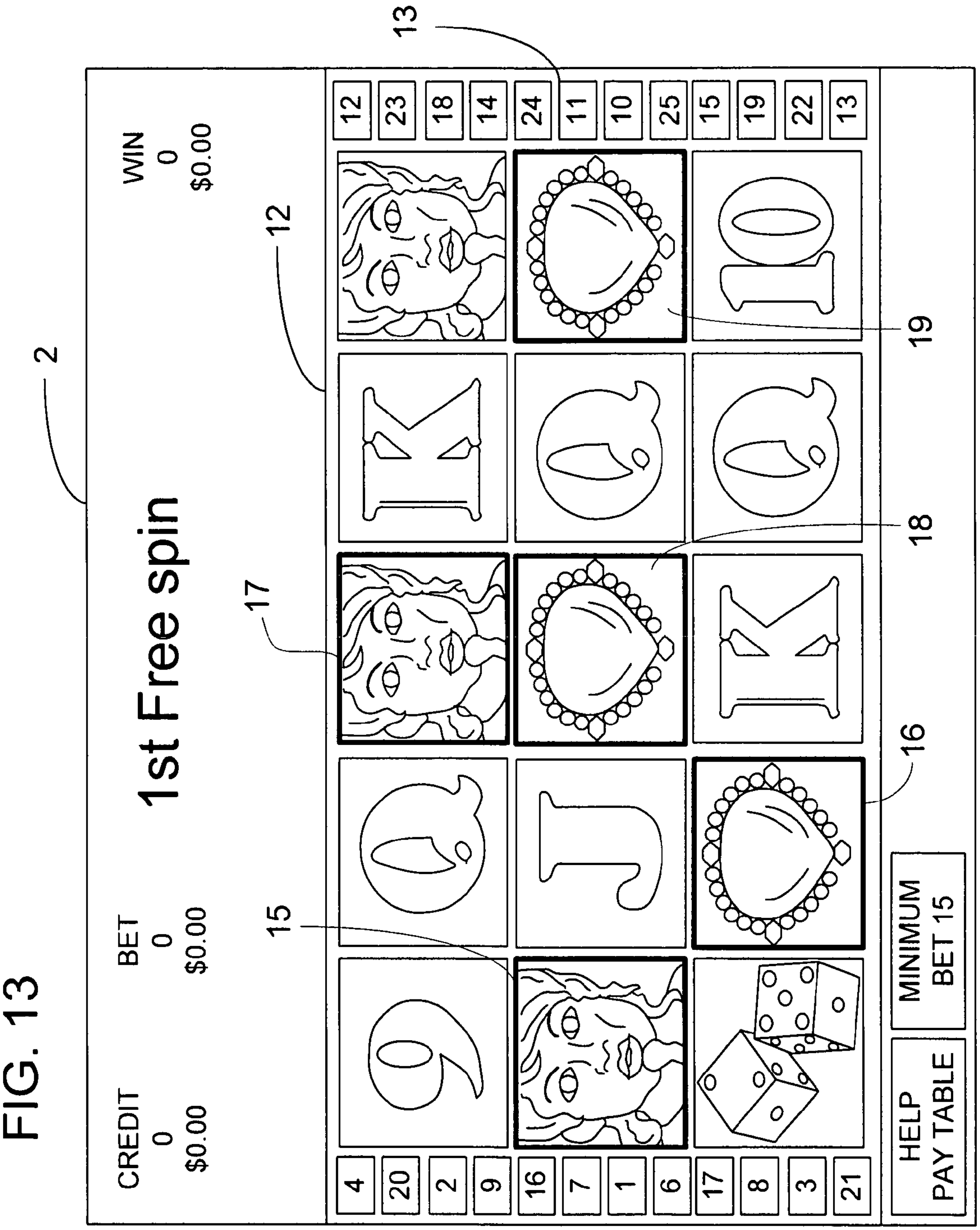
FIG. 13 is a diagram illustrating a state where a game situation shown in FIG. 12 has progressed further.

FIG. 13 is a diagram illustrating a state where a game situation shown in FIG. 12 has progressed further. FIG. 13 illustrates a state after the controller 30 has performed the first free slot game (or 1st Free spin) in the free spin game. As noted, different symbols are displayed on two groups of selected cells. Specifically, the wild symbols are displayed on the cells 15 and 17 belonging to the first group. The jewelry symbols are displayed on the cells 16, 18 and 19 belonging to the second group.

Figure 14:
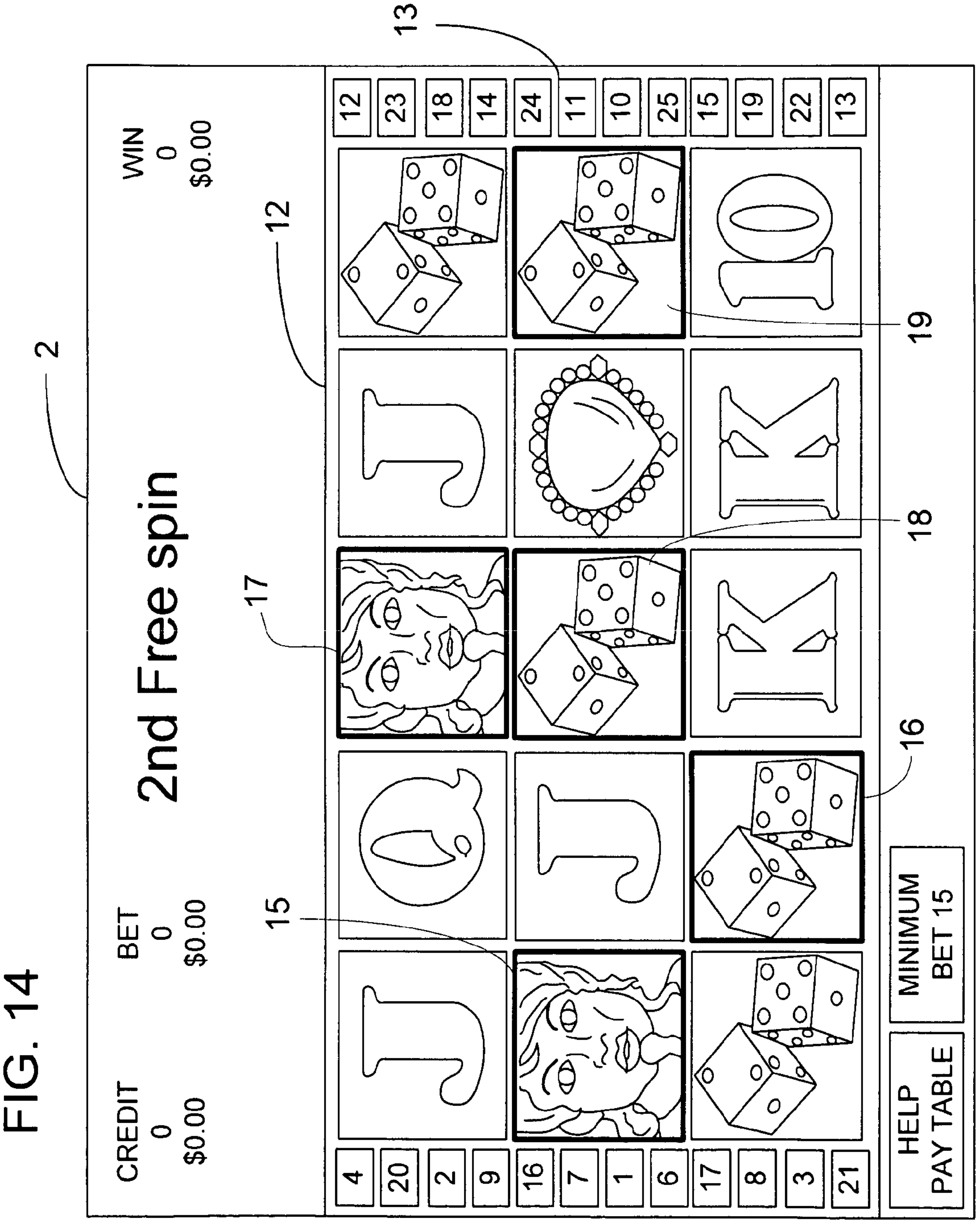
FIG. 14 is a diagram illustrating a state where a game situation shown in FIG. 13 has progressed further.

FIG. 14 is a diagram illustrating a state where a game situation shown in FIG. 13 has progressed further. FIG. 14 illustrates a state after the controller 30 has performed the second free slot game (or 2nd Free spin). The wild symbols are displayed on the cells 15 and 17. The dice symbols are displayed on the cells 16, 18 and 19. Thus, in each of the two groups of the selected cells, the same symbol is displayed. However, different symbols are displayed for different groups of selected cells. Thus, even in the case where the selected cells are divided into a plurality of groups, the symbols displayed in the cells belonging to the same group can be the same or related with each other so that the player can have an expectation of higher chance of winning combinations (and thus higher excitement) in the free game.

In this embodiment, when the controller 30 selects cells, the selected cells can be divided into two or more groups. The symbols shown in the cells belonging to the same group in the free spin game after the cell-selecting stage are preferably the same or related to each other. For example, when the selected cells are divided into the first group and the second, the wild symbols may be displayed on all of the selected cells of the first group, while high reward symbols may be displayed on all of the selected cells of the second group. It is also preferable for the controller 30 to change the number of the groups according to the number of the cells displayed on the display. For example, when there are relatively many cells, the controller 30 may set up more groups (for example, three or more groups).

Next, another embodiment of the game, which is executed by the gaming machine pertaining to the present invention, will be described in reference to FIGS. 15-17. Unlike the above-described examples, in this embodiment, the cells aligned in the vertical direction are integrated to form a column. In this embodiment, each column has a virtual reel therein such that three symbols on the reel are shown in the column at the same time when the reel is not spinning.

Figure 15:
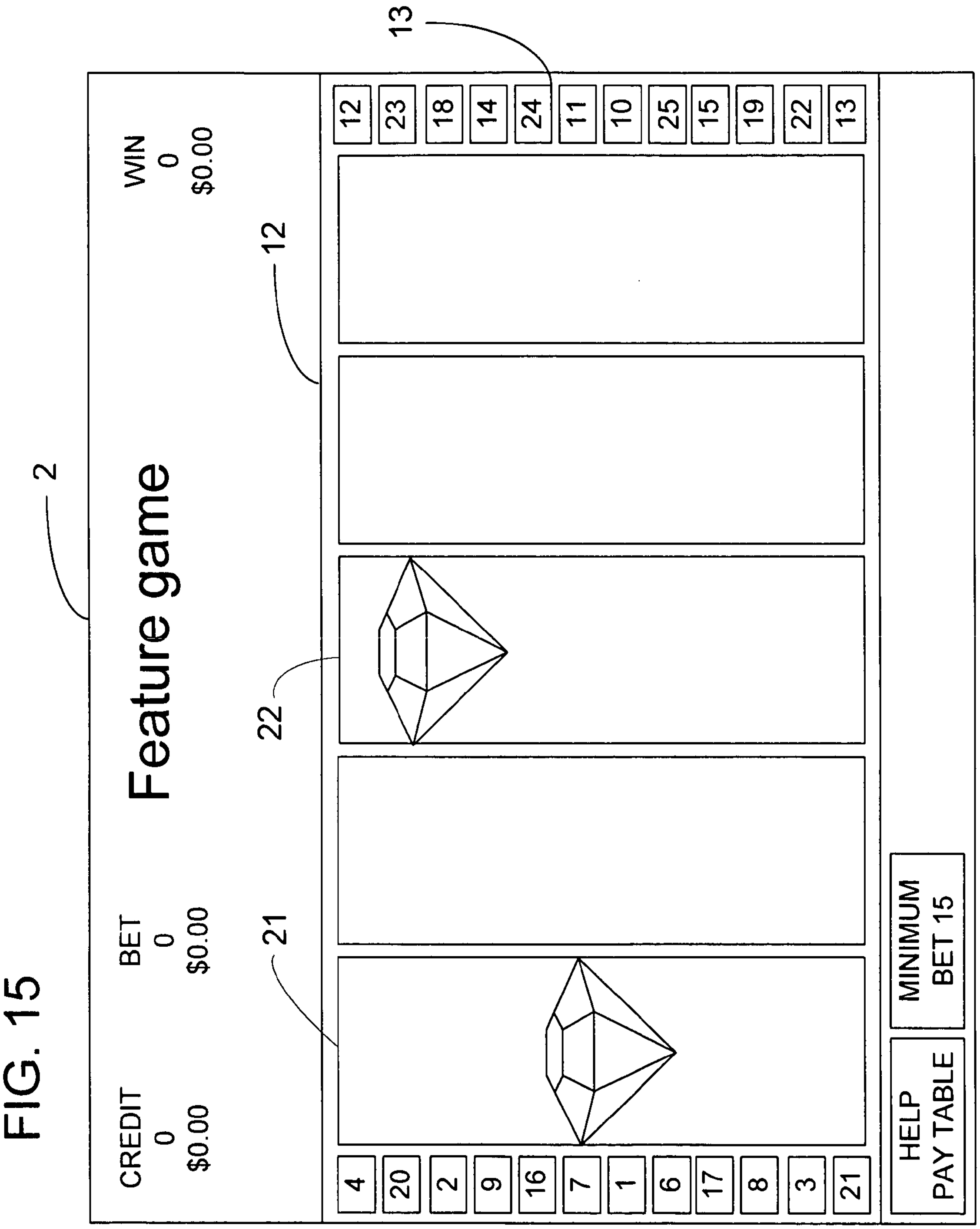
FIG. 15 is a diagram illustrating a further example of a game executed by the gaming machine pertaining to the present invention.

FIG. 15 illustrates a column selecting stage for selecting one or more columns to which a predetermined function is given in the secondary game. In the shown embodiment, the controller 30 has selected columns 21 and 22 and the diamond symbols are displayed on the columns 21 and 22 to indicate the selection.

Figure 16:
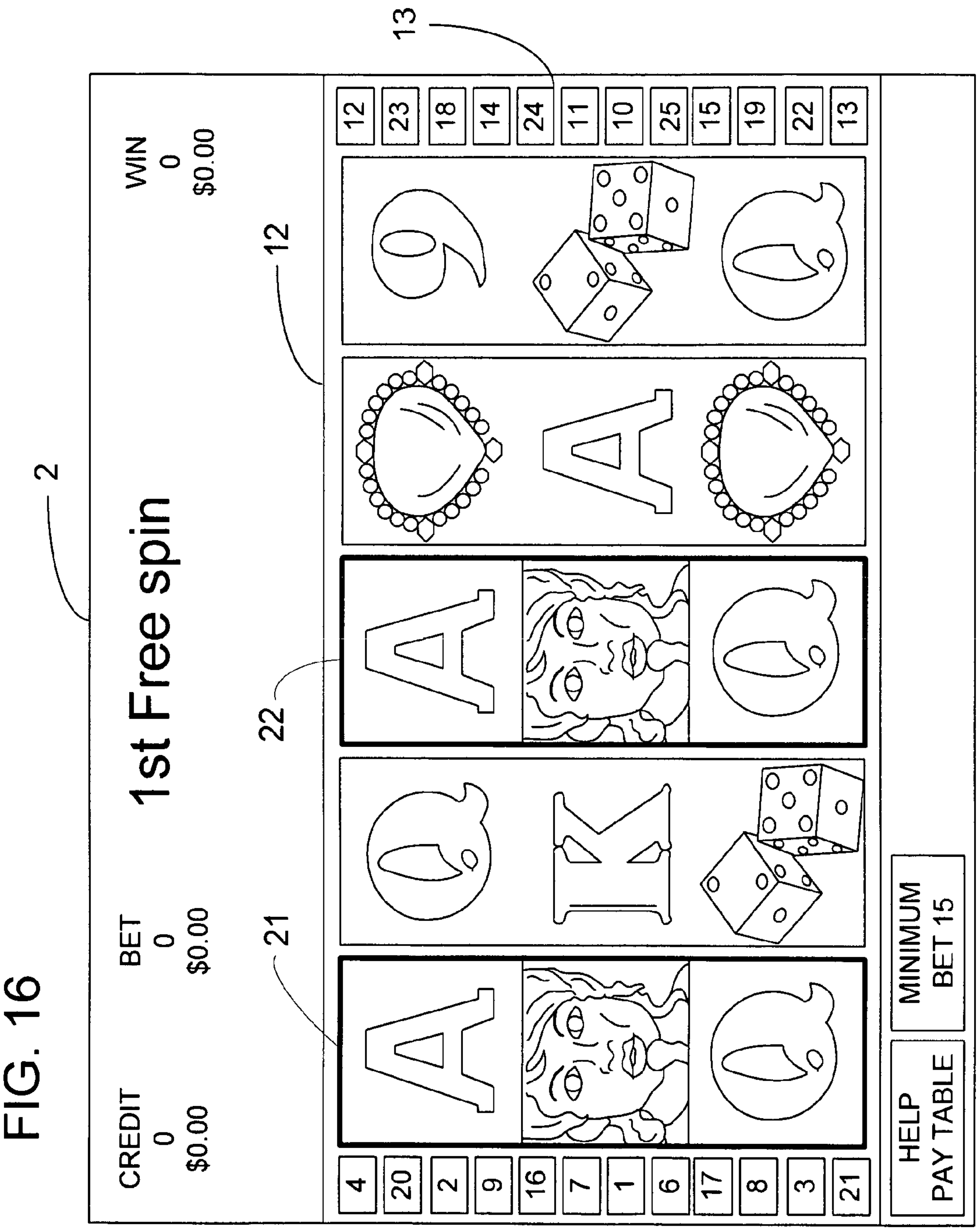
FIG. 16 is a diagram illustrating a state where a game situation shown in FIG. 15 has progressed further.

FIG. 16 is a diagram illustrating a state where the game situation shown in FIG. 15 has progressed further. FIG. 16 illustrates a state after the controller 30 has performed the first free slot game (1st Free spin). As shown on the selected columns 21 and 22, a plurality of symbols displayed on these columns is contrastingly arranged. In other words, the plurality of symbols on the selected columns 21 and 22 include the same symbols which are arranged in the same order. By this arrangement, it is possible to provide a sensation of a unity of the symbols on the reels to the player. This can make the player feel that a winning combination of symbols is likely to occur and thus encourage the player to continue to play the game.

Figure 17:
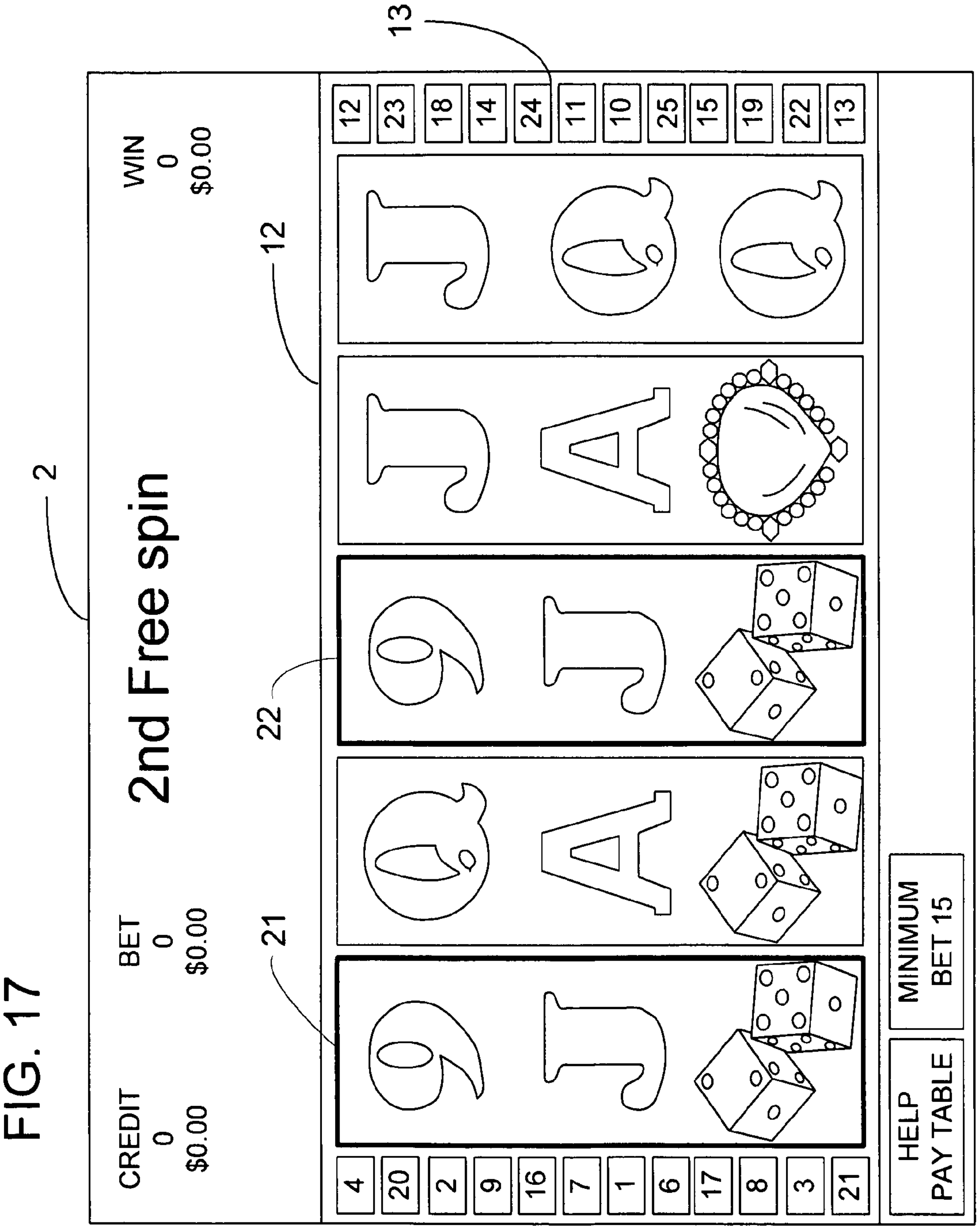
FIG. 17 is a diagram illustrating a state where a game situation shown in FIG. 16 has progressed further.

FIG. 17 is a diagram illustrating a state where the game situation shown in FIG. 16 has progressed further. FIG. 17 illustrates a state after the controller 30 has performed the second free slot game (2nd Free spin). In the example of FIG. 17 also, a plurality of symbols are contrastingly arranged on the selected columns 21 and 22. Thus, a plurality of symbols may be displayed contrastingly on the selected columns for every slot game of the free spin game. The symbols contrastingly displayed on the selected reels should not be particularly limited to specific symbols. The symbols and their order may be different for each spin. Alternatively, the same symbols may be displayed every time on the selected columns for different free spins. The symbols displayed on one selected column may not necessarily be different from each other. The symbols displayed on one selected column may include two or more same symbols or all symbols displayed on the column may be the same.

As an example of this embodiment, if all of the columns are selected in the column selecting stage, a plurality of the same symbols may be displayed in the same order on all columns (for example, the first column to the fifth column) in the secondary game. This will result in displaying the symbols providing a sensation of a unity to the player on all the columns on the display, which can increase the expectation of the player on a big win in the secondary game.

When the controller 30 selects two or more columns, a plurality of symbols shown on the display along the columns may be displayed so that the plurality of symbols are the same to each other and arranged in the same order. For example, as shown in FIG. 16, in the case where first and third columns are selected, when "A and a wild symbol and Q" are displayed on the first column, "A and a wild symbol and Q" may also be displayed on the third column. Of course, the number of symbols displayed along each column should not be limited to three and can be of any number. For example, the above-mentioned way for displaying the symbols in the selected columns can also be applied to a case where the controller 30 displays four or five symbols along the column. Further, in the above embodiment, the columns extend in the vertical direction such that when the reels rotate, the player will see the symbols on the reels move in the vertical direction. However, the columns may extend in a horizontal direction such that when the reels rotate, the player will see the symbols on the reels move in the horizontal or lateral direction. Such an arrangement is often referred to as a "horizontal reel" structure, and the present invention can be also applicable to such a structure to select a "horizontal" column(s).

On the other hand, the number of the columns (or reels) displayed on the display 12 may also be any number. However, when the number of entire reels is 5 for example, it is preferred that the controller 30 selects about ⅖-⅘ of the entire columns. It is more preferred that the controller 30 selects about ⅗ of the entire columns. If the number of columns is selected within ⅖-⅘ of the entire columns, these numbers are moderate when designing the secondary game, which excites the player. By the way, in the present invention, the column-selecting stage may also be referred to as "feature game".

In the above-mentioned cell- and column-selecting stage, the same or the related symbols can be displayed on all of the selected cells and columns. In the case where the cells and columns are shown in one screen, the controller 30 may select either a cell(s) or a column(s) or may select both of a cell(s) and a column(s). When both of the cell(s) and column(s) are to be selected, the cell selection and column selection may be performed at the same time or at different times. Furthermore, the cells or the columns that the controller 30 is able to select may be arranged in a horizontal direction and/or a diagonal direction.

In the game pertaining to the present invention, it is not necessarily required that only one symbol be displayed on one cell. Two or more symbols may be displayed on one cell. Also, it may be possible that a single symbol may be displayed across two or more cells. For example, a symbol extending from the upper end to the lower end of a certain column can be displayed across two or more cells. This extended symbol may not only extend vertically, but it may extend horizontally or diagonally.

Symbols displayed on cells or columns other than the selected cells or columns may be randomly displayed by using a random number. The symbols on the non-selected cells or columns may be the same as or different from the symbols displayed on the selected cells or columns.

After the cell-selecting stage or column-selecting stage, predetermined symbols, which may be the same or related to each other, are displayed in the selected cells or the selected columns when conducting the secondary game. Since the same symbols or the symbols related to each other in the selected cells or columns can generally appear to lead to a winning combination with a high probability, the player can have an expectation that winning combinations can easily be achieved and a big award can be obtained in the secondary game.

Figure 18:
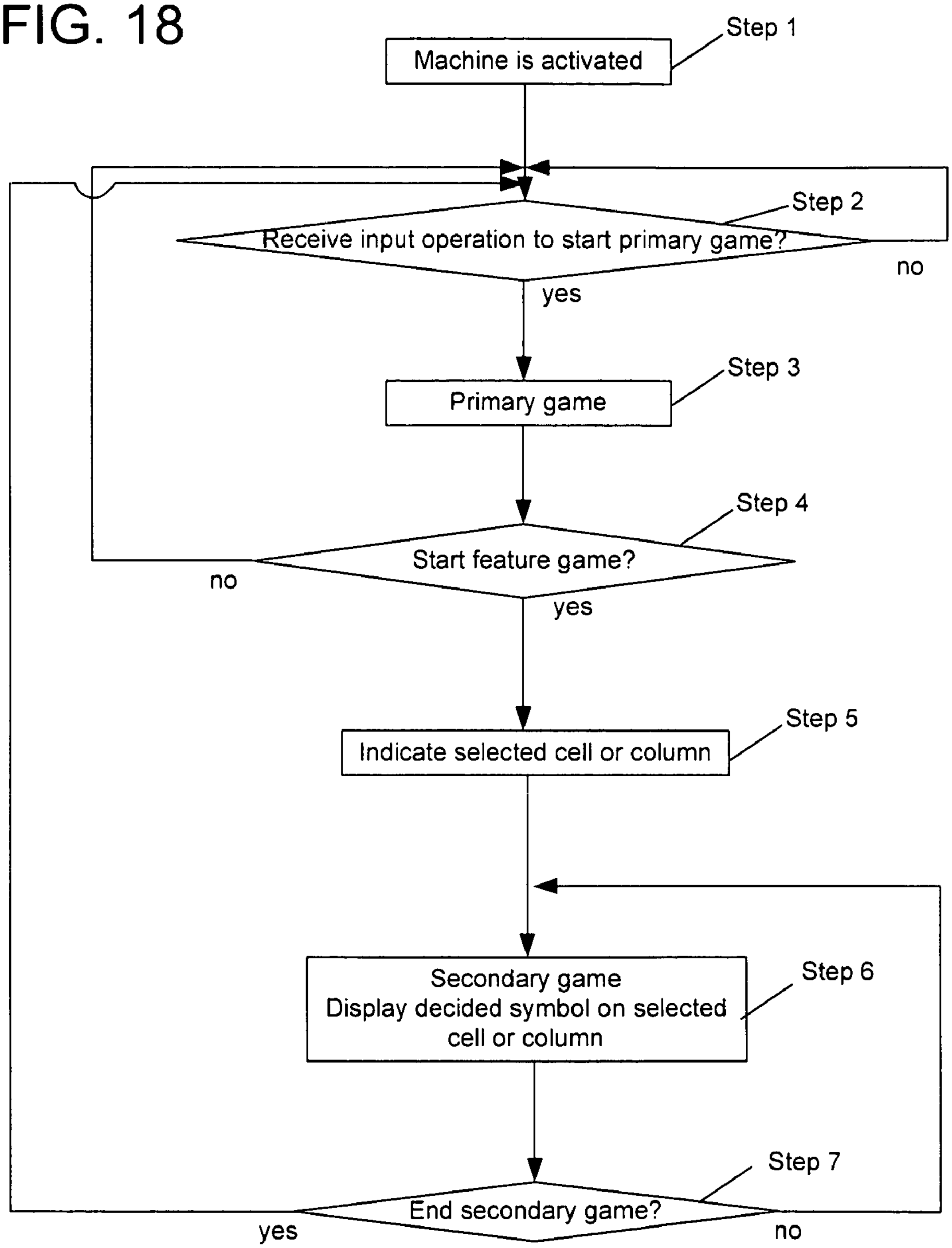
FIG. 18 is a flowchart illustrating an operation of a gaming machine pertaining to the present invention to perform a game.

Next, an operation of the gaming machine pertaining to the present invention to execute the above-mentioned game will be described. FIG. 18 is a flowchart illustrating an example of the operation that the gaming machine of the present invention performs. FIG. 18 indicates an essential operation of the present invention. First, the gaming machine is activated when the gaming machine is powered on (step 1). The controller 30 equipped in the gaming machine waits for an input operation from a player to start the primary game (step 2). When the controller 30 receives the input operation, the controller 30 starts and executes the primary game (step 3). If the controller 30 does not receive the input operation from the player, it keeps waiting for the input operation.

The controller 30 starts the cell or column-selecting stage (the cell or column-selecting stage is also referred to as feature game.) if the controller 30 recognizes that a predetermined condition is satisfied (step 4) in the primary game. If the controller 30 recognizes that a predetermined condition is not satisfied, the process goes back to step 2 and the controller 30 waits for the input operation from the player to start the primary game. If it is found that the predetermined condition is satisfied in step 4, the process proceeds to step 5 in which the controller 30 indicates a selected cell or column on the display in the feature game (step 5). Usually, selecting the cell or column is executed by the controller 30 when the controller 30 receives the input operation from the player. However, this selecting may be executed any time by the controller 30.

The controller 30 starts the secondary game after indicating the selected cell or column. The controller 30 indicates a decided symbol on the selected cell or column in the secondary game (step 6). Usually, selection of the symbol to be indicated on the selected cell or column is executed by the controller 30 when the controller 30 receives the input operation from the player. However, this selection may be executed any time by the controller 30. After the secondary game, the controller 30 determines if the secondary game is finished (step 7). If the controller 30 determines that the secondary game is finished, the controller 30 waits for the input operation from the player to start the primary game (step 2). If the controller 30 decides that the secondary game is not finished yet, the controller 30 starts the secondary game again (step 6).

Figure 19:
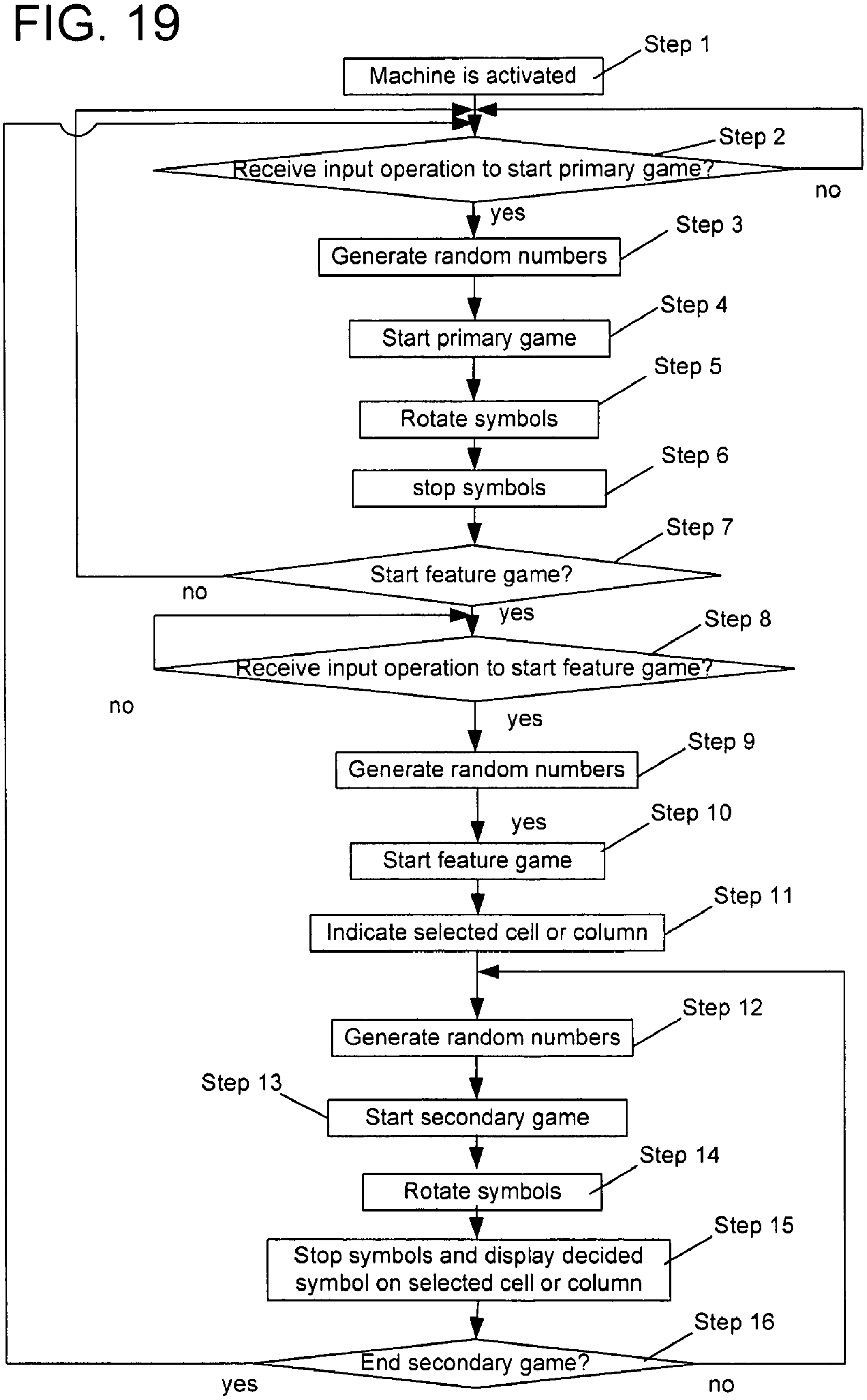
FIG. 19 is a flowchart illustrating an example of the operation that the gaming machine of the present invention performs.

Next, FIG. 19 will be explained. FIG. 19 is a flowchart illustrating another example of the operation that the gaming machine of the present invention performs. First, the gaming machine is activated when the gaming machine is powered on (step 1). The controller 30 equipped in the gaming machine waits for the input operation from the player to start the primary game (step 2). When the controller 30 receives the input operation, the controller 30 decides results of the primary game by generating a random number (step 3) and starts the primary game on the display (step 4). In the primary game, the controller 30 rotates the reels for a while and then stops the rotation of the reels to show the symbols according to the decided game results (steps 5 and 6). The controller 30 pays out the award if the winning symbol combination is arranged on the activated pay line. If the controller 30 does not receive the input operation from the player, it keeps waiting for the input operation (step 2).

After that, the controller 30 starts the cell-selecting stage or column-selecting stage (the cell-selecting stage or column-selecting stage is also referred to as a feature game.) if the controller 30 determines that a predetermined condition is satisfied by generating the random number (step 7). If the controller 30 determines that the predetermined condition is not satisfied, the controller 30 waits for the input operation from the player to start the primary game again (step 2). If it is found that the predetermined condition is met in step 7, the process goes to step 8 where the controller 30 waits for an input operation from the player to start the feature game (step 8). When the controller 30 receives the input operation, the controller 30 conducts the cell-selection or column-selection by generating a random number (step 9) and then starts the feature game on the display (step 10). The controller 30 indicates a selected cell or column on the display in the feature game (step 11) by highlighting the selected cell or selected column to be recognized from the player, for example. If the controller 30 does not receive the input operation from the player, it keeps waiting for the input operation to start the feature game (step 8).

Then, the controller 30 generates random numbers to decide results of the secondary game and symbols to indicate on the selected cell or column (step 12). After generating the random numbers, the controller 30 starts the secondary game (step 13). The controller 30 rotates the reel for a while and then stops the reels (steps 14 and 15) to show the symbols decided with the random numbers including those on the selected cell or column (step 15). After calculating the prizes to be paid out to the player based on the shown symbols, the controller 30 determines if the secondary game is finished (step 16) or not. If the controller 30 determines that the secondary game is finished, the process goes to step 2 where the controller 30 waits for the input operation from the player to start the primary game. If the controller 30 determines that the secondary game is not finished yet, the controller 30 starts the secondary game again (step 12).

Figure 20:
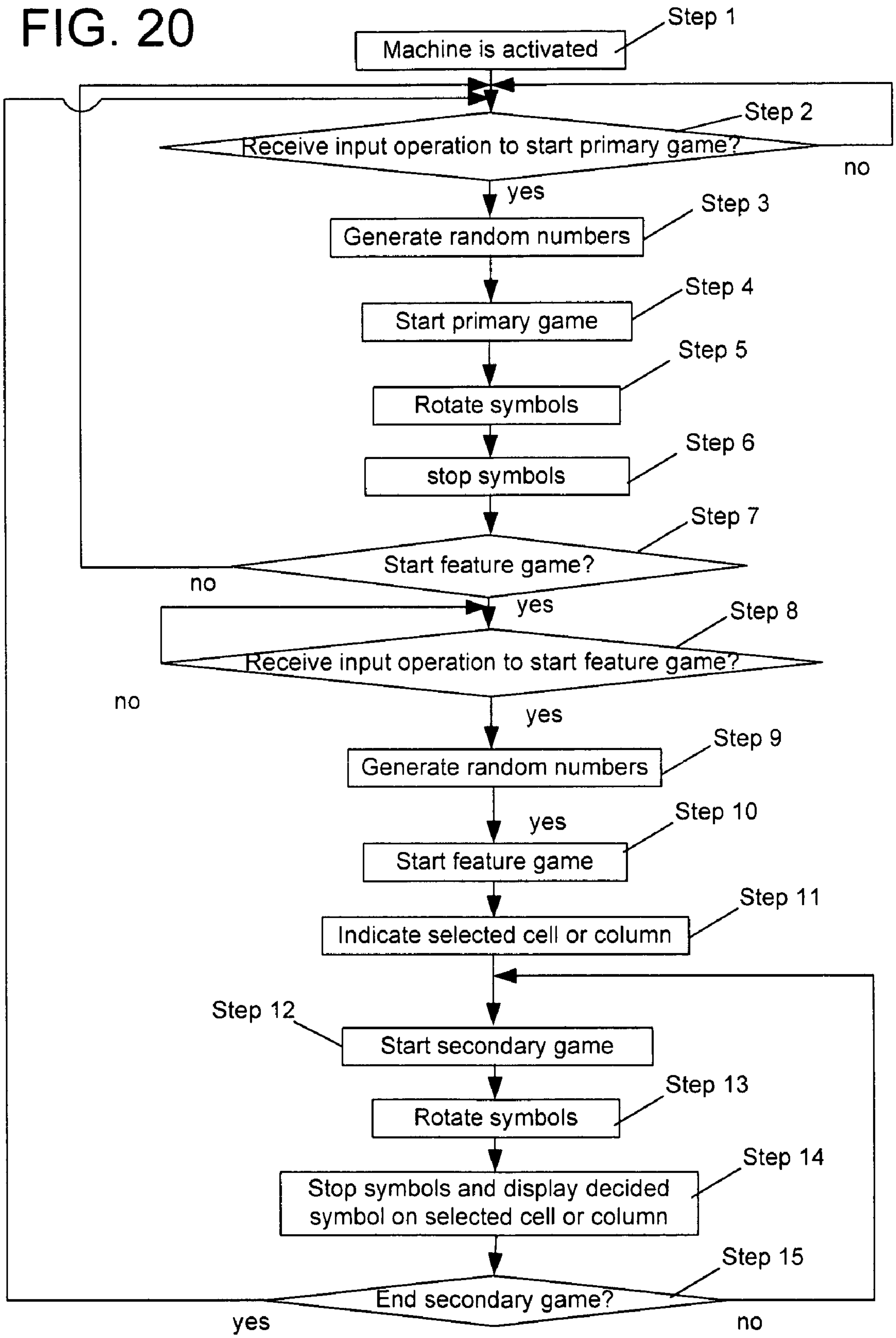
FIG. 20 is a flowchart illustrating another example of the operation that the gaming machine of the present invention performs.

Next, FIG. 20 will be explained. FIG. 20 is a flowchart illustrating another example of the operation that the gaming machine of the present invention performs. The operation of FIG. 20 is similar to FIG. 19, but FIG. 20 is different from FIG. 19 in terms of not having the step to generate a random number before starting the secondary game (i.e., step 12 in FIG. 19). Namely, in the embodiment of FIG. 20, the random numbers generated in step 9 are used not only in selecting the cell or column but also in deciding the results of the secondary game including what symbols should be shown in the selected cells or columns. After that, the controller 30 executes the feature game and then executes the secondary game without the step of generating the random number corresponding to step 12 of FIG. 19.

Figure 21:
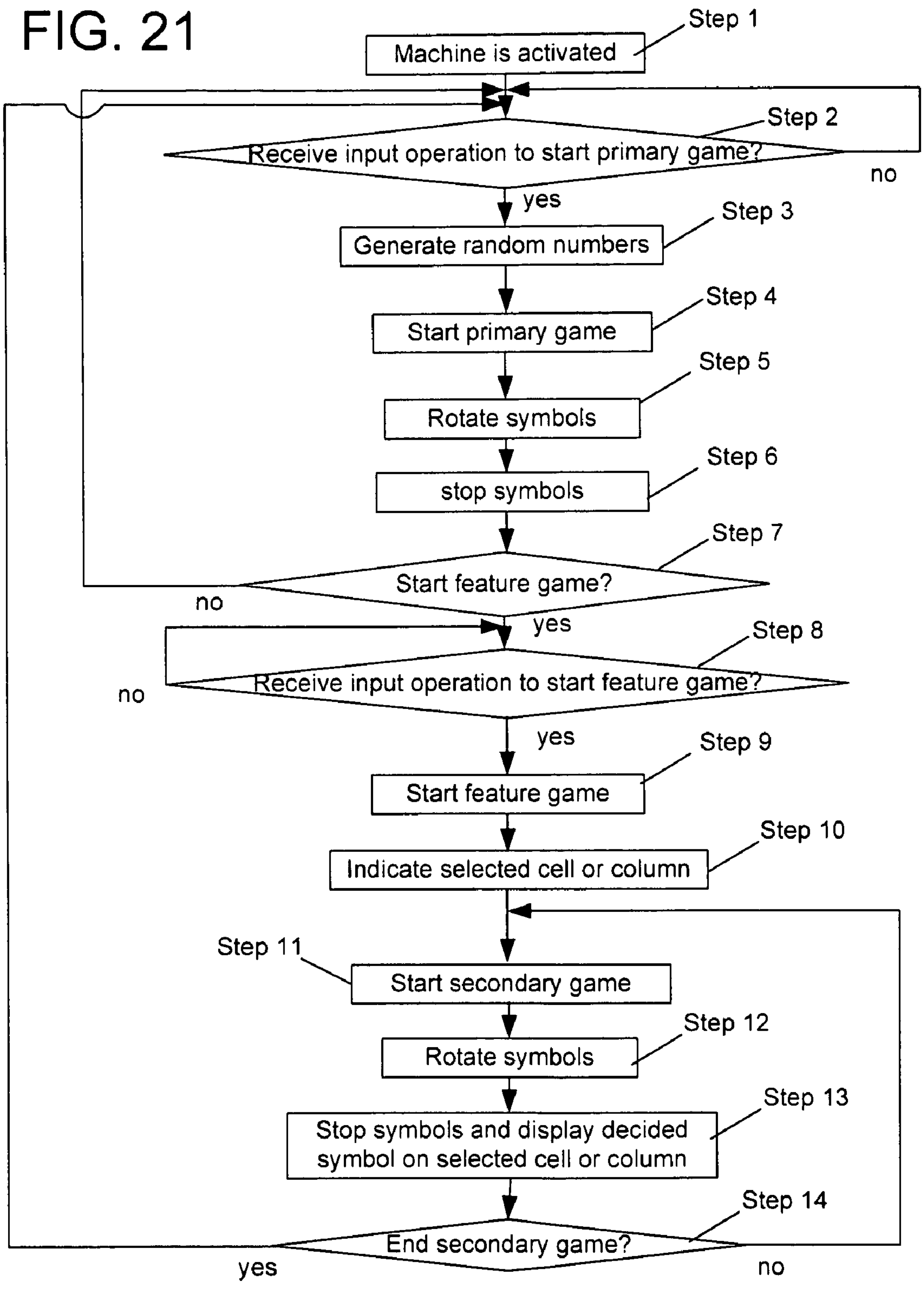
FIG. 21 is a flowchart illustrating another example of the operation that the gaming machine of the present invention performs.

Next, FIG. 21 will be explained. FIG. 21 is a flowchart illustrating another example of the operation of the gaming machine of the present invention. The operation of the gaming machine in FIG. 21 is similar to the operation of gaming machine in FIG. 19, but FIG. 21 is different from FIG. 19 in terms of not having the steps (steps 9 and 12 of FIG. 19) to generate the random number before starting the feature game and starting the secondary game. In other words, the controller 30 decides the results of the primary game and the secondary game and selects the cell or column indicated in the feature game based on the random numbers generated in step 3. Therefore, the operation of FIG. 21 does not have the steps corresponding to the steps 9 and 12 of FIG. 19.

FIGS. 19, 20 and 21 are to explain the timing when to generate the random numbers to decide game results including the primary game, the feature game and secondary game. However, the timing to generate the random numbers is not limited to the flowcharts illustrated in FIGS. 19, 20 and 21 and the timing to generate the random number may be any appropriate time. For example, the timing for generating random numbers used in the cell or column selection may be after the controller 30 stops the rotation of the reels on the display to show the results of the primary game, i.e., between steps 6 and 7 in FIG. 19.

Figure 22:
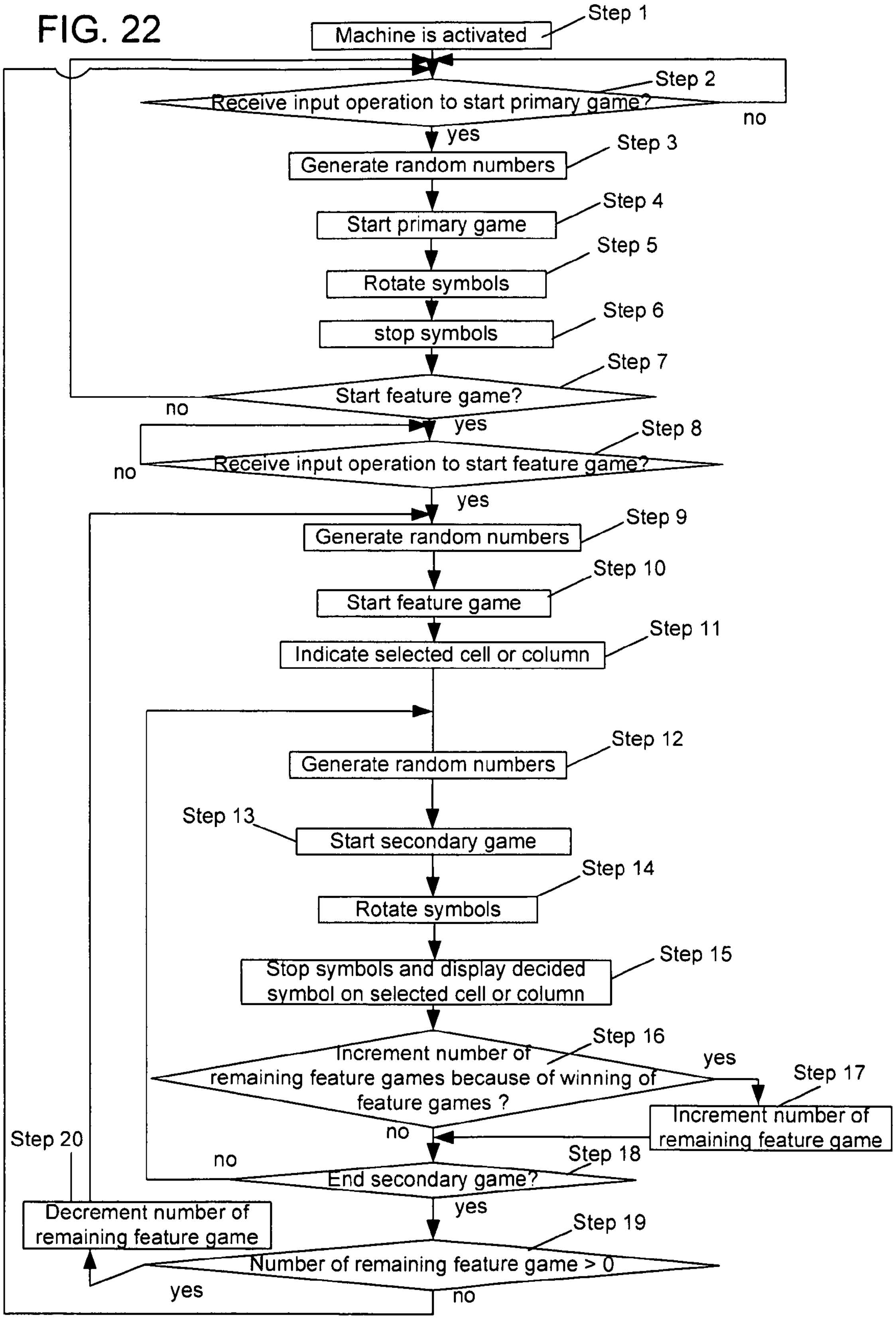
FIG. 22 is a flowchart illustrating another example of the operation that the gaming machine of the present invention performs.

Next, FIG. 22 will be explained. FIG. 22 is a flowchart illustrating another example of the operation that the gaming machine of the present invention performs. FIG. 22 explains the case that the player wins the feature game (or additional secondary game) in the secondary game. In FIG. 22, the steps 1 to 15 are the same as the steps 1 to 15 of FIG. 19. In FIG. 22, the controller 30 decides whether the predetermined condition is satisfied or not to increment the number of remaining feature game (step 16). If the predetermined condition is satisfied, the controller 30 increments the number of remaining feature game (step 17). If the predetermined condition is not satisfied (step 16) or the controller 30 increments the number of feature game (step 17), the controller 30 determines whether the secondary game has been finished or not (step 18). If the controller 30 decides that the secondary game has not been finished, the controller 30 keeps executing the secondary game (step 12). If the controller 30 decides that the secondary game has been finished, the controller 30 determines whether the number of remaining feature game is more than 0 (step 19). If the number of remaining feature game is more than 0, the controller 30 executes the feature game again after decrementing the number of remaining feature game (step 20 and steps 9-11). If the number of remaining feature game is 0 in step 19, the controller 30 waits for the input operation from the player to start the primary game (step 2). After executing the new feature game in steps 9-11, the controller 30 conducts the “additional” secondary game (steps 12-18). The operation of the gaming machine is not limited to the operation shown by the above-mentioned flow chart. For example, in the flowcharts of FIGS. 19-22, the feature game (cell-selection or column selection) is conducted only once before executing the secondary game. However, as mentioned above, it is possible to conduct the feature game a plurality of times in the secondary game such as when the feature game is provided between every adjacent reel spins of the free spin game executed as the secondary game.

As mentioned above, although the present invention has been concretely described, the present invention is not limited to the above embodiments and various changes and modifications may be made without departing from the scope of the invention. For example, the game pertaining to the present invention is capable of being executed even when either a stepper reel or a video reel (or virtual reel) is used. When executing the game pertaining to the present invention using the stepper reel, the display in the gaming machine may be dual structured. That is, for example, while installing a stepper reel in the gaming machine, a transparent type display can be installed on the surface side. In this way, it is possible to make the symbols on the stepper reel selectively visible to the player by adjusting the transparent type display to a transparent or non-transparent state. It is also possible to display symbols or other visual indications on the transparent type display so as to superimpose or modify the symbols on the stepper reel. For example, a transparent type liquid crystal display, a transparent type organic EL display, etc. can be used as the transparent type display.

What is claimed is:

1. A gaming machine comprising:

a display, which shows a plurality of cells indicating a plurality of symbols; and a controller, which selects at least a cell, which displays the same symbol or mutually related symbols therein in a cell-selecting stage provided between a primary game and a secondary game on the display, the selected cell being arranged to be different in color and/or shape from a non-selected cell in the plurality of cells, controls the plurality of symbols in the secondary game and gives a predetermined function to the selected cell in the secondary game, wherein location of the selected cell in the plurality of cells remains the same until the second game ends.

2. The gaming machine according to claim 1, wherein the controller shows a wild symbol on the selected cells.

3. The gaming machine according to claim 1, wherein the primary game and the secondary game are a slot game conducted by using reel strips provided in the gaming machine, each reel strip defining a sequence of symbols, and wherein the controller uses a reel strip different from the reel strips used for the primary and secondary games is used by the controller in the cell selecting stage to visually indicate the selected cell by showing a predetermined symbol on a reel strip in the selected cell.

4. The gaming machine according to claim 1, wherein the secondary game is a free game.

5. The gaming machine according to claim 1, wherein the controller shows a plurality of symbols related with each other under a substantially static state on the selected cells on the display while moving the symbols in non-selected cells in the secondary game.

6. The gaming machine according to claim 1, wherein the controller decides whether the controller selects zero or more cells in the cell-selecting stage.

7. A gaming machine comprising:

a display, which displays a plurality of reels presenting a plurality of indicia controlled along the reels so as to be indicated in a plurality of cells defined on the display; and a controller, which executes a free spin game, in which a plurality of reel spins is conducted during a term from an initiation to a termination of the free spin game and a game result is evaluated for each reel spin based on the indicia indicated in the cells, selects at least one cell as a first group and selects at least one cell as a second group, each of the first group and the second group showing the same indicium or mutually related indicia before an execution of the free spin game, and gives a predetermined function to the selected cell in the free spin game, wherein the selected cell as the first group and the selected cell as the second group are arranged to be different in color and/or shape from a non-selected cell in the plurality of cells, and wherein locations of the selected cell as the first group and the selected cell as the second group remain the same until the free spin game ends.

8. The gaming machine according to claim 7, wherein the controller shows a same indicium on the selected cell for more than one reel spin in the free spin game.

9. The gaming machine according to claim 7, wherein the controller shows an indicium on the at least one cell selected as the first group and shows an indicium, which is independent of the indicium shown on the at least one cell selected as the first group, on the at least one cell selected as the second group.

10. The gaming machine according to claim 9, wherein the indicium shown on the at least one cell selected as the first group is different from the indicium shown on the at least one cell selected as the second group.

11. The gaming machine according to claim 9, wherein the controller shows indicia on the at least one cell selected as the first group and on the at least one cell selected as the second group at the same timing.

12. The gaming machine according to claim 9, wherein the controller shows indicia on the at least one cell selected as the first group and on the at least one cell selected as the second group at different timing.

13. The gaming machine according to claim 7, wherein the controller decides whether the controller selects zero or more cells in the selection.

14. A gaming machine comprising:

a display which shows a plurality of columns for indicating a plurality of symbols therein; and a controller, which controls the plurality of symbols indicated in the columns, implements a column-selecting stage to select a column among the plurality of columns, and gives a predetermined function to the selected column in a secondary game after finishing a primary game and before starting a secondary game, wherein the selected column is arranged to be different in color and/or shape from a non-selected column in the plurality of columns, and wherein location of the selected column in the plurality of columns remains the same until the second game ends.

15. The gaming machine according to claim 14, wherein the controller shows a plurality of symbols related with each other on the selected column.

16. The gaming machine according to claim 14, wherein the controller selects more than one of the plurality of columns in the column-selecting stage.

17. The gaming machine according to claim 16, wherein the controller shows the same symbols with the same order on each of the selected columns on the display in the secondary game.

18. The gaming machine according to claim 14, wherein the primary game and the secondary game are a slot game conducted by using reel strips provided in the gaming machine, each reel strip defining a sequence of symbols, and wherein a reel strip different from the reel strips for the primary and secondary games is used by the controller in the column selecting stage to visually indicate the selected column by showing a predetermined symbol on the reel strip in the selected column.

19. The gaming machine according to claim 14, wherein the controller decides whether the controller selects zero or more columns in the column-selecting stage.

* * * * *